(12) United States Patent
Hebbar et al.

(10) Patent No.: US 8,165,937 B1
(45) Date of Patent: Apr. 24, 2012

(54) SYSTEM AND METHOD FOR MANAGING INFORMATION RELATED TO SECURITIES AND SECURITIES ISSUERS

(75) Inventors: Sharda Hebbar, Longwood, FL (US); Paula Stuart, Orlando, FL (US)

(73) Assignee: Digital Assurance Certification L.L.C., Orlando, FL (US)

( * ) Notice: Subject to any disclaimer, the term of this patent is extended or adjusted under 35 U.S.C. 154(b) by 715 days.

(21) Appl. No.: 11/669,642

(22) Filed: Jan. 31, 2007

(51) Int. Cl.
  *G06Q 40/00* (2012.01)
(52) U.S. Cl. ....................................................... 705/35
(58) Field of Classification Search ................ 705/36 R, 705/35
  See application file for complete search history.

(56) References Cited

U.S. PATENT DOCUMENTS

| | | | |
|---|---|---|---|
| 4,566,066 A | 1/1986 | Towers ........................ 364/408 |
| 5,809,483 A | 9/1998 | Broka et al. .................... 705/37 |
| 5,893,079 A | 4/1999 | Cwenar ........................... 705/36 |
| 5,915,209 A | 6/1999 | Lawrence ..................... 455/31.2 |
| 6,161,099 A | 12/2000 | Harrington et al. .............. 705/37 |
| 6,381,585 B1 | 4/2002 | Maples et al. .................. 705/36 |
| 6,446,047 B1 | 9/2002 | Brier et al. ........................ 705/35 |
| 6,876,309 B1 | 4/2005 | Lawrence ................ 340/825.26 |
| 7,343,339 B2 | 3/2008 | Harrison, Jr. et al. ........... 705/37 |
| 7,801,791 B2 | 9/2010 | Hebbar et al. ............. 705/36 R |
| 2001/0039524 A1 | 11/2001 | Harrison, Jr. et al. ........... 705/35 |
| 2001/0051879 A1 | 12/2001 | Johnson et al. .................... 705/2 |
| 2001/0051935 A1 | 12/2001 | Sugiura ........................... 706/12 |
| 2002/0016758 A1 | 2/2002 | Grigsby ........................... 705/36 |
| 2002/0099646 A1 | 7/2002 | Agarwal et al. ................. 705/37 |
| 2002/0152155 A1 | 10/2002 | Greenwood et al. ............. 705/38 |
| 2002/0156719 A1 | 10/2002 | Finebaum et al. ............... 705/37 |
| 2003/0046205 A1 | 3/2003 | Brier et al. ....................... 705/35 |
| 2003/0046206 A1 | 3/2003 | Sato ................................. 705/35 |
| 2003/0061082 A1 | 3/2003 | Stoutenburg et al. ............. 705/7 |
| 2003/0093351 A1 | 5/2003 | Sarabanchong ................. 705/36 |
| 2003/0110106 A1 | 6/2003 | Deshpande et al. ............. 705/36 |
| 2003/0120578 A1 | 6/2003 | Newman ......................... 705/36 |
| 2003/0126055 A1 | 7/2003 | Thal et al. ........................ 705/36 |
| 2003/0149654 A1 | 8/2003 | Harrington et al. ............. 705/36 |
| 2003/0163405 A1 | 8/2003 | Wiener et al. ................... 705/36 |
| 2003/0167221 A1 | 9/2003 | Kochansky ..................... 705/36 |
| 2003/0204464 A1* | 10/2003 | Hebbar et al. .................. 705/36 |
| 2003/0225655 A1 | 12/2003 | Hughes, Jr. et al. ............ 705/36 |
| 2005/0071265 A1 | 3/2005 | Nishimaki ...................... 705/38 |
| 2005/0097030 A1 | 5/2005 | Lawrence ....................... 705/37 |
| 2005/0187857 A1 | 8/2005 | Tull, Jr. ........................... 705/37 |

(Continued)

OTHER PUBLICATIONS

National Federation of Municipal Analysts, "Recommended Best Practices in Disclosure for Variable Rate and Short-Term Securities", Feb. 2003.*

(Continued)

*Primary Examiner* — Eric T Wong
(74) *Attorney, Agent, or Firm* — Pillsbury Winthrop Shaw Pittman LLP

(57) ABSTRACT

A system and method that enables a financial institution managing a money market fund to meet the requirements of SEC Rule 2a-7. The system and method may enable an issuer of an instrument or security to provide information to investors that are regulated by SEC Rule 2a-7, in such a manner that the instrument or security of the issuer may be purchased and held by money market funds. This includes enabling the money market fund to verify that one or more securities issued by one or more issuers meet the three of the basic requirements of the Rule, namely (1) portfolio maturity, (2) portfolio quality, and (3) portfolio diversification.

26 Claims, 14 Drawing Sheets

U.S. PATENT DOCUMENTS

2007/0168218 A1   7/2007   Harrison, Jr. ............... 705/1

OTHER PUBLICATIONS

Apacheweek, "Using User Authentication", Oct. 18, 1996.*

Securities and Exchange Commission letter addressed to Vinson & Elkins LLP dated Sep. 21, 2001, 2 pages.

Hume, Lynn, "SEC: Broker-Dealers Can Use DAC Instead of NRMSIRs for Rule 15c2-12", reprinted from *The Bond Buyer*, Sep. 25, 2001, 1 page.

Resnick, Amy B., "Market Disclosure System Termed Seriously Flawed", *Bond Buyer*, New York, NY, Feb. 21, 2002, vol. 339, Issue 31329, p. 4.

"CDI System Approval", MSRB Reports, vol. 17, No. 2, Jun. 1997, 3 pages.

"Rule 15c2-12—Municipal Securities Disclosure" *Securities Lawyer's Deskbook*, The University of Cincinnati College of Law, copyright 1998-2006, 8 pages.

MAC Insights, Edition IV—Amended, A Publication of the Municipal Advisory Council of Texas, Sep. 1998, pp. 1-12.

MSRB Forum on Disclosure, Washington, D.C., Nov. 11-12, 1998, 10 pages.

MAC Insights, Edition V, A Publication of the Municipal Advisory Council of Texas, Feb. 1999, pp. 1-16.

"NCSHA's Pilot Program on Electronic Disclosure Gets Under Way", *The Bond Buyer*, May 19, 1999, p. 22.

Municipal Advisory Council of Texas letter dated May 21, 1999, 4 pages.

"Centralizing Disclosure?", by Lynn Hume, *The Bond Buyer*, The Daily Newspaper of Public Finance, Sep. 10, 1999, 2 pages.

Municipal Advisory Council of Texas, 45$^{th}$ Annual Meeting Presentation, Oct. 15, 1999, 13 pages.

MAC Insights, Edition IX, A Publication of the Municipal Advisory Council of Texas, Mar. 2000, pp. 1-12.

MAC Insights, Edition XI, A Publication of the Municipal Advisory Council of Texas, Sep. 2000, pp. 1-8.

DAC Web Service Screenshots (Welcome to DAC, DAC Search, Trustee Portfolio), copyright 2000, 7 pages.

MSRB Discussion Paper on Disclosure in the Municipal Securities Market, copyright 2000 Municipal Securities Rulemaking Board, 17 pages.

"DAC Pushes 'Soup-to-Nuts' Disclosure System; Talks to Ruth", by Lynn Hume, *The Bond Buyer*, Feb. 26, 2001, 3 pages.

"Filing with SEC; Electronic Submission of Official Statements, Advance Refunding Documents and Forms G-36(OS) and G-36 (ARD) to the MSRB", *MSRB*, vol. 21, No. 2, Jul. 2001, pp. 37-42.

Memorandum from The Bond Market Association to Secondary Market Disclosure Task Force—NRMSIR Subcommittee dated Aug. 21, 2001, 5 pages.

MAC Insights, Edition XV, A Publication of the Municipal Advisory Council of Texas, Sep. 2001, pp. 1-12.

"2001 Municipal Market Roundtable 'Secondary Market Disclosure for the 21$^{st}$ Century'", United States Securities and Exchange Commission, Division of Market Regulation, Office of Municipal Securities, Nov. 14, 2001, New York City, 68 pages.

MAC Insights, Edition XVI, A Publication of the Municipal Advisory Council of Texas, Dec. 2001, pp. 1-12.

MAC Insights, Edition XVII, A Publication of the Municipal Advisory Council of Texas, Mar. 2002, pp. 1-12.

Digital Assurance Certification (DAC) Marketing Brochure, copyright 2000, 62 pages.

Rulemaking for EDGAR System, Final Rule, Securities and Exchange Commission, Release Nos. 33-7855; 34-42712 et al., Apr. 24, 2000, pp. 1-18 and 27-39.

"Issuers and Dealers Look for Way to Make Cusips Easier to Obtain", by Lynn Hume, *Bond Buyer*, vol. 341, Issue 31456, New York, New York, Aug. 23, 2002, 3 pages.

Simonsen, Bill, et al., "Municipal Bond Issuance: Is There Evidence of a Principal-Agent Problem?", *Public Budgeting & Finance*, vol. 18, No. 4, Winter 1998, pp. 71-100 (31 pages).

In U.S. Appl. No. 11/672,196, a Notice of Allowance issued on Aug. 4, 2010, 12 pages.

In U.S. Appl. No. 11/499,767, an Office Action issued on Mar. 30, 2009, 8 pages.

In U.S. Appl. No. 11/499.767, an Office Action issued on Jan. 20, 2010, 13 pages.

"Filing with SEC; Changes Proposed to the CDI System", *MSRB Reports*; vol. 15, No. 2, Jul. 1995, 3 pages.

* cited by examiner

SYSTEM AND METHOD FOR MANAGING INFORMATION RELATED TO SECURITIES AND SECURITIES ISSUERS

FIELD OF THE INVENTION

The invention relates to systems and methods for enabling financial institutions managing money market funds to meet the requirements of SEC Rule 2a-7.

BACKGROUND OF THE INVENTION

The issuance, offer and initial sale of municipal bonds are regulated by federal securities law. The laws require bond issuers to provide these disclosures at the time the bonds are issued. Certain aspects of subsequent sales of issued securities are governed by the Securities and Exchange Commission ("SEC") Rule 15 c2-12 ("Rule 15 c2-12"). Rule 15 c2-12, in part, mandates that brokers and dealers transacting in municipal bonds have reliable access to material information concerning the bond issuer's financial condition. This necessitates that bond issuers (or their agents) make certain disclosures over the lifetime of the bond. For example, the issuer must make certain periodic filings and must disclose certain material events as they occur.

Traditionally, disclosing this information in a satisfactory and coherent manner was difficult. As a result, brokers and dealers had difficulty accessing information regarding a municipal bond prior to recommending it to a customer. This created certain problems for broker/dealers when trying to comply with Rule 15 c2-12.

For some time, the SEC has required bond issuers to disclose the above-mentioned information to Nationally Recognized Municipal Securities Information Repositories (NRMSIRs), State Information Depositories ("SIDs"), and disclosure information systems established and operated by the Municipal Securities Rulemaking Board ("MSRB Systems," and, together with NRMSIRs and SIDs "Municipal Disclosure Repositories," referred to herein as MDRs).

MDRs serve as points where information could be deposited by issuers and retrieved by interested parties. As a means of preventing fraud in the municipal market, Brokers and Dealers (as those terms are legally defined by the SEC) in municipal securities are required to have access to systems, (including, for example, Municipal Disclosure Repositories) that provide reliable information about municipal issuers and their bonds.

Issuers, however, have had difficulty in fully utilizing NRMSIRs, SIDs and MSRB Systems. Some issuers have contended that NRMSIRs are not "user friendly," and that there is little feedback when incomplete information is accidentally submitted. Further, NRMSIRs do not affirmatively remind issuers when information is due to be submitted. Brokers and Dealers transacting in municipal bonds have had some difficulty in meeting regulatory requirements because of uncertainty over the reliability of information available through NRMSIRs. Specifically, whether information required to be filed was, in fact, filed and, if filed, whether the information was actually received has been difficult to determine. Brokers and Dealers have complained that the information on file at the NRMSIRs is inconsistent and the SEC staff has noted inconsistent filings among NRMSIRs in sample studies. Also, Issuers traditionally could not easily verify that their disclosure filings have been received and accurately filed with NRMSIRs, SIDs and MSRB Systems. As a result, Brokers and Dealers transacting in municipal bonds sometimes could not, with certainty, comply with current regulatory mandates such as the Rule 15 c2-12.

In order to address these and other issues related to the distribution and dissemination of information related to Issuers and the securities they issue (e.g., related to material events, etc.), Digital Assurance Certification LLC ("DAC") developed a system for gathering information from Issuers of municipal securities and distributing information evenly to municipal disclosure repositories, regulatory bodies and the public. One aspect of the DAC system is a computer application, which can be implemented on a computer system that is attached to a network of computers and other communication devices, such as the Internet, and that enables Issuers to securely enter ongoing information (e.g. periodic filings and material event notes) about one or more bond issues. This information may include annual audits of the issuer, certain operating data, and any event notices deemed material by the issuer. Such information is provided to comply with the contractual obligations of the issuer to the bond holders and to provide Brokers and Dealers with a procedure for meeting regulatory requirements that provide prompt notice of events relating to bonds they recommend to customers. For information that is required to be submitted on a periodic basis, the system determines when the information is due to be submitted, and prompts the issuer to file such information with the system. This information is then published to the public, and, simultaneously, transmitted to the municipal disclosure repositories and/or regulatory bodies via a one-click dissemination system.

In the DAC system, if the issuer does not submit the required information by the due date, the system generates a notice that the required information was not submitted by the issuer. Additionally, the system establishes an audit trail for gathering and distributing information. Another important aspect of the audit includes receiving and archiving a receipt that information was transmitted to the MDRs and/or one or more regulatory body. Additionally, the system provides a secure platform for communication among issuers and their investors via electronic mail and teleconferencing. Additional information regarding the DAC system may be found, for example, in U.S. Pat. No. 7,155,408, entitled "Method and Apparatus for Managing Information and Communications Related to Municipal Bonds and Other Securities", which is incorporated herein by reference in its entirety.

The SEC also regulates some of the institutional purchasers of debt instruments, like bonds and/or other long-term financial instruments. For example, money market funds typically invest in corporate debt, government treasury debt, government agency debt, and/or other debt. With the return on these (and other) investments, a money market fund may provide a return to its account holders (as well as profit for itself). Money market funds tend to invest in short-rated debt. This typically includes instruments that may not be regulated by the SEC in the same fashion as traditional long-term bond issues. As a result, the SEC may enforce rules on the money market funds that require the funds to self-regulate with respect to the types of instruments that they purchase. For example, SEC Rule 2a-7, 17 C.F.R. §270.2a-7, ("Rule 2a-7") regulates money market funds and specifies the characteristics of investments to be purchased and held by money market funds. Regulating funds that may invest in issues that are unregulated has the effect of indirectly regulating the issues, as an issue may not be able to attract investors unless it enables potential investors to comply with the relevant regulations (e.g., Rule 2a-7)

The general requirements of the Rule 2a-7 include that a money market fund must (a) maintain a portfolio maturity appropriate to its objective of maintaining a stable net asset value or price per share, (b) limit its portfolio investments to those securities that the fund's board of directors determines (i) present minimal credit risks and (ii) are at the time of acquisition "eligible securities," and (c) maintain a diversified portfolio. Furthermore, money market funds are required by the Rule 2a-7 to evaluate securities in their portfolios at the time of acquisition and periodically thereafter for compliance with these provisions of the Rule.

As has been mentioned above, three of the basic requirements of Rule 2a-7 may include (1) portfolio maturity, (2) portfolio quality, and (3) portfolio diversification. With respect to portfolio maturity, Rule 2a-7 generally prohibits a fund from acquiring any instrument with a remaining maturity from trade date of greater than 397 calendar days. Additionally, Rule 2a-7 may require the fund to maintain a dollar-weighted average portfolio maturity of 90 days or less. However, funds may rely on demand features, insurance, or other third party guarantees (such as the demand feature of a variable rate demand note) as a maturity-shortening device under Rule 2a-7. As will be discussed further below, a demand feature or other guarantee of a security such as a variable rate demand note may either be conditional or unconditional. A conditional guarantee may include a guarantee that is limited by certain conditions.

Reliance on a guarantee to meet Rule 2a-7's maturity restrictions with respect to a given security may essentially require one or both of (i) a credit risk determination by the purchaser/holder on the guarantor (e.g., the issuer of the guarantee), as well as the issuer of the primary security, and/or (ii) an assessment of any events that may lead to the termination of a conditional demand feature. This may be the case because the reliance on the guarantee provided by the guarantor may be roughly equivalent to the purchase of a put option on the primary security from the guarantor that enables the overall position to meet the maturity requirement of Rule 2a-7. In other words, the purchase of a security like a variable rate demand note may be viewed in some respects as a purchase of two separate securities, the note itself, which is the primary security, and the guarantee (or put option) that is provided, or issued, by the guarantor. Therefore, some analysis of the secondary security (e.g., the guarantee) included in a variable demand note (or similar instrument) may be necessary to meet the maturity restriction (and/or other restrictions) of Rule 2a-7.

In some instances, information related to the credit risk of the issuer of the guarantee and/or the conditions of the guarantee may be inconvenient for a purchaser/holder to obtain. This may be for a variety of reasons including, for example, that generally issuers of guarantees on instruments issued by municipalities refuse to make information regarding their credit-worthiness, the terms of their agreements with issuers, and/or other information related to their operations available to the general public. Further, there may be no secure, accessible mechanism for an issuer to provide this type of information to purchaser/holders.

With respect to the portfolio quality requirement of Rule 2a-7, Rule 2a-7 generally provides that a money market fund shall limit its portfolio investments to securities that the fund's board of directors determines present minimal credit risks and that are at the time of acquisition eligible securities. The fund board's determination must be based on factors pertaining to credit quality in addition to any rating assigned to such securities. Typically, money market funds may not be able to buy or hold a security unless it is rated in one of the two highest short-term rating categories by a requisite number of nationally recognized rating agencies or, if unrated, the security is determined to be of comparable quality to such rated securities. However, this may be a necessary, but not a sufficient condition, as rating agency ratings on a security are considered under Rule 2a-7 to be relevant to credit quality, but not overall eligibility under Rule 2a-7. Each security purchased by a money market fund must also satisfy an independent determination by the board (and/or an investment adviser that reports to the board) that it presents "minimal credit risk" to the fund. If a security no longer presents credit risk, or if the fund has insufficient information to maintain minimal credit risk determination, the fund must (under Rule 2a-7) dispose of it as soon as practicable.

As was mentioned above, some securities that include guarantees (e.g., including a demand feature), such as a variable rate demand note, actually may be analogous to two separate securities (the primary security and the underlying guarantee). Therefore, in order to purchase and/or hold a security that includes a guarantee, a purchaser/holder governed by Rule 2a-7 must be make a determination as to the credit quality of the guarantee. Typically a guarantee may include (1) a letter of credit, (2) a financial guaranty (e.g., bond) insurance, and/or (3) a demand feature.

A demand feature may include an unconditional demand feature or a conditional demand feature. In order for a guarantee with a conditional demand feature to be an eligible security under Rule 2a-7, a purchaser/holder must have access to information that enables it to determine that there is a minimal risk of the occurrence of circumstances which would result in the conditional demand feature not being exercisable. In addition to the determination of the likelihood of occurrence of the condition(s) limiting exercise, Rule 2a-7 may also require that either (1) the condition(s) limiting exercise be monitored readily, or (2) that the fund will receive notice of the occurrence of the condition and the opportunity to exercise the conditional demand feature. Even though the terms of these guarantees (including the circumstances which result in the conditional demand feature not being exercisable) are not generally open to the public, the system and method disclosed herein may provide a mechanism that enables a purchaser/holder to receive such information via disclosures that are subject to restricted access.

With respect to the portfolio diversification aspect of Rule 2a-7, Rule 2a-7 may impose specific percentage limits on a money market fund's exposure to the issuers (both primary issuers and secondary issuers such as guarantors or other guarantors) of securities held in the fund with the aim of avoiding excessively concentrated credit risk. In order to comply with Rule 2a-7, a fund may be required to know at substantially all times the correct obligors and guarantors (e.g., remarketing agents, insurers, etc.) on securities owned by the fund in order to avoid violating the diversification percentages dictated by Rule 2a-7.

The Rule 2a-7 imposes both substantive and procedural requirements on investment companies managing money market funds. Every security purchased by a money market fund must by an "eligible security" under the Rule, satisfying the Rule's requirements for credit quality, portfolio diversification, and effective maturity. Since the goal of a money market fund is that its shares be liquidatable at par, the Rule 2a-7 provides how the current price per share is calculated for purposes of distribution, redemption and repurchase of any money market fund share. In calculating the current share price, the Rule 2a-7's requirements must be met and the fund's board of directors must determine, in good faith, that it is in the best interests of the fund and its shareholders to maintain a stable net asset value or price per share, by virtue of the permitted methodology of price calculations, only so long as the board believes that the method fairly reflects the market-based net asset value per share. Thus, events in the life of a security after acquisition by a money fund are as important as any that occurred prior to acquisition.

In order to attract investment from entities such as money market funds, some issuers may issue short-rated, long-term instruments, such as variable rate demand notes or other variable or floating-rate securities. However, for a variety of reasons the structure of these types of instruments may not lend themselves to investment by an entity, such as a money market fund, that is regulated by the Rule 2a-7. For example, the provisions of Rule 2a-7 may not be reflected in many forms of standard documentation for short-term and variable and floating-rate municipal securities.

A variable rate demand note is an example of a security that is not regulated by the SEC, and may have the potential to provide a money market fund with an investment option. However, due to one or more structural flaws in a given variable rate demand note, a note may or may not enable an investing money market fund to meet the requirements of the Rule 2a-7. Variable rate demand notes are floating rate instruments with terms of as much as 40 years. They may pay interest monthly or quarterly based on a floating rate that is reset daily or weekly based on an index of short-term municipal rates. Variable rate demand notes are purchased at par. Liquidity is provided with a put feature, which allows the holder to put the security for par plus accrued interest on any interest rate reset date, usually with one or seven days notice. A guarantor such as a bank or other entity typically serves as a liquidity provider. If a variable demand rate note is put back, it is put back to the guarantor, rather than the issuer. The guarantor may try to resell the variable demand rate note or, failing that, may hold the note in its own inventory. A variable demand note may typically have a credit enhancement such as a letter of credit from a guarantor or bond insurance.

While the demand feature of a variable rate demand note (e.g., the ability of the purchaser to put the note at par) may provide a degree of liquidity that enables a money market fund to meet the requirements of the Rule 2a-7 (e.g., portfolio maturity, credit worthiness, diversification, etc.), this may not always be the case. For example, the demand feature may be conditional and may not provide the fund with the requisite liquidity. Further, various aspects of a variable rate demand note may not be regulated by the SEC, thus, obtaining information related to the note, its issuer, and/or or its guarantor may be inefficient, inconvenient, and/or unworkable for a financial institution forced to comply with the Rule 2a-7.

While the DAC system, as originally configured, enabled issuers to make filings of disclosures and material event notices that become publicly available, this information did not necessarily enable money market funds to obtain all of the information that they needed to comply with Rule 2a-7. Some of the information needed to comply with Rule 2a-7 is generally not publicly available and some of the interested parties want to minimize certain types of information that becomes public (e.g. terms of guarantees, etc). Thus, the original DAC system, which was designed primarily to comply with Rule 15 c2-12, did not provide all of the information needed for funds governed by Rule 2a-7 (e.g., information that could not and/or should not be disseminated generally to the public) related to specific issuers and/or securities. Accordingly, in its original configuration, the DAC system would, in some instances, notify funds regulated by Rule 2a-7 that an event of interest had occurred with respect to a security (e.g., the substitution of an insurer or guarantor, as is discussed below), but did not enable these funds to securely and conveniently access all of the information that would dictate whether the event of interest would necessitate a liquidation, and/or prevent the purchase, of the corresponding security.

SUMMARY

One aspect of the invention relates to a system and method that enables issuers to make disclosures that relate to Rule 15 c2-12, where such disclosures are automatically distributed to the appropriate parties (e.g., NRMSIRs, SIDs, MSRB, etc.) and become publicly available; and also enables issuers to make supplemental disclosures that include information that enables financial institutions managing money market funds to meet the requirements of Rule 2a-7, where at least some of the supplemental disclosures are subject to restricted access. The restricted access may be granted only to those limited number of entities who need such information (e.g. money market funds). In order to provide disclosures that are subject to restricted access, the system and method may relate to an electronic informational clearinghouse that facilitates secure and customizable storage, organization, and dissemination of information related to securities in order to enable institutional investors like money market funds to comply with the self-regulatory requirements of Rule 2a-7. This may include enabling the electronic storage, organization, and dissemination (e.g., over a network) of not only information related to a primary security issued by an issuer, but also information related to a secondary security associated with the primary security, such as a demand feature, insurance, or other guarantee. The restricted access features provided by the system and method disclosed herein may facilitate ownership of securities by investors regulated by Rule 2a-7 that otherwise may be unable to own the securities due to the inefficiency, costliness, etc. to the investors of obtaining the information that the disclosed system and method provide via restricted access.

In one implementation, the system and method disclosed herein include providing a centralized, secure repository that may enable an issuer to provide restricted access to information related to a guarantee of a security, such as terms and/or information related to the issuer of a guarantee (e.g., financial information, credit rating information, etc.), to purchasers/holders in a convenient, automated, customizable, and/or secure manner.

The provision of secure information via restricted access may be integrated with a conventional system and/or method for disseminating information related to securities. For example, as was mentioned above, the original configuration of the DAC system (and/or as described in the '863 application) may be configured to disseminate to the appropriate parties (via public channels) information related to material events under Rule 15 c2-12. One such occurrence that would require disclosure by the issuer of a security under Rule 15 c2-12 would include the substitution of a guarantor providing the guarantee of the security. This disclosure, under Rule 15 c2-12, would merely require disclosure that a substitution had been made, and the identity of the new guarantor. The information related to the new guarantor that would be relevant under Rule 2a-7 would not be disclosed publicly (e.g., for the reasons discussed above). However, the system and method described herein may be integrated with the original DAC system (or other system providing such functionality) to not only publicly disclose the appropriate information regarding the substitution in compliance with Rule 15 c2-12, but also to provide a supplemental disclosure (which would be subject to restricted access) to purchasers/holders of the security that are governed by Rule 2a-7 with the information which they would require to purchase/hold the security in light of the substitution. For example, the supplemental disclosure may be made in conjunction with the Rule 15 c2-12 disclosure, and may include the dissemination of the relevant, secure, information to the limited number of purchasers/holders subject to Rule 2a-7.

Further, the system and method may enable an issuer of a security to provide information related to a credit downgrade, a payment default, an insolvency or bankruptcy event, and/or other information related to conditions limiting exercise of one or more demand features for storage within the secure repository. The system and method may operate to disseminate such information to one or more interested parties (e.g., purchasers/holders, guarantors, etc.) in a secure manner to give effective notice to the one or more interested parties of the conditions, but not make the information generally available to the public.

In some implementations of the system and method disclosed herein, disclosures to purchasers/holders that are subject to restricted access may be made to keep these and/or other interested parties apprised of an identity of an issuer of a primary security (e.g., the obligor of a note or bond, etc.) as well as the identity of one or more issuers of secondary securities such as demand features or other guarantees that are included with the primary security (e.g., a guarantor, etc.). The system and method may enable the information to be stored and/or disseminated in a secure, convenient, and/or customizable manner.

These and other objects, features, and characteristics of the present invention, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates a user interface, in accordance with one or more embodiments of the embodiments.

FIG. 3 illustrates a user interface, in accordance with one or more embodiments of the embodiments.

DETAILED DESCRIPTION

Figure 1:
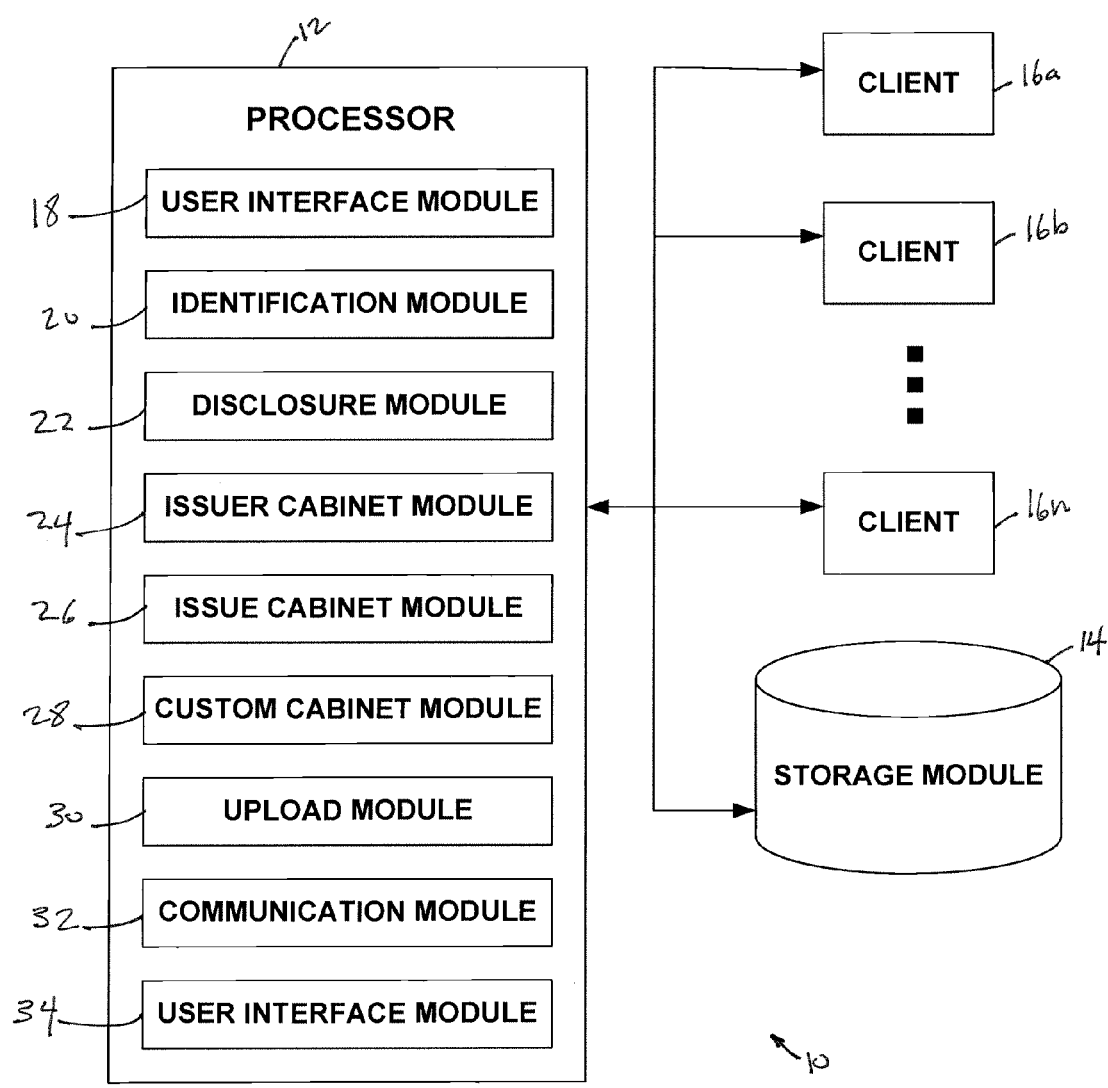
FIG. 1 illustrates a system configured to manage information related to securities issuers and securities issued by the securities issuers, according to one or more embodiments of the invention.

FIG. 1 illustrates a system 10 that manages information related to securities such as bonds, notes, and/or other financial instruments issued by issuers (e.g., municipalities, agencies, corporations, etc.). In some embodiments, system 10 may include a processor 12, a storage module 14, one or more client devices 16 (illustrated as client devices 16a-16n), and/or other components. The management of information related to securities by system 10 may include gathering information from issuers and/or other information related to securities, securely distributing information to interested parties (e.g., municipal disclosure repositories, regulatory bodies, brokers, dealers, the public, purchasers/holders, etc.), prompting issuers to submit information, issuing alerts about information that has not been submitted in a timely fashion, issuing incorrect or incomplete information, securely storing information, providing secure access to information, and/or otherwise managing information related to issued securities and/or issuers. In some instances, system 10 may provide a secure, customizable repository that enables issuers of securities to provide information to purchasers/holders via restricted access such that money purchasers/holders are able to determine whether selected securities qualify as "eligible securities" under Rule 2a-7. As has been mentioned above, some implementations, some or all of the components and/or functionality of system 10 may be provided in conjunction with some or all of the components and/or functionality of the method and apparatus for managing information and communications related to municipal bonds and other securities (e.g. as described in the '863 application).

Client devices 16 may include one or more of a client computer (e.g., a desktop computer terminal, a laptop computer terminal, a handheld computer terminal, etc.), a personal digital assistant, a mobile telephone, a pager, or other client devices. Client devices 16 may be in operative communication with processor 12. Operative communication between client devices 16 and processor 12 may be achieved via an operative link. The operative link may include a wired connection, a wireless connection, a discrete connection, a connection established via a network (e.g., the Internet, a WAN, a LAN, a MAN, etc.), and/or other operative links. In some embodiments, client devices 16 may provide some or all of the functionality of the customer computers discussed in the '863 application.

Storage module 14 may include electronic storage media that electronically store information, such as information being managed by system 10. In some embodiments, storage module 14 may include magnetic storage media (e.g., a magnetic hard drive, floppy disks, magnetic storage tapes, etc.), optical storage media (e.g., optically encoded disks, etc.), solid state storage media (e.g., flash memory, etc.), and/or other electronic storage media. In some instances, storage module 14 may store information in an organized form, such as a database or other organized forms. In one embodiment, storage module 14 may store information in a relational database. In some implementations, storage module 14 may provide some or all of the functionality provided by the storage server in the '863 application.

Processor 12 enables the management of information within system 10. This includes managing the storage of information in storage module 14 and the transfer of information to and from client devices 16. In some implementations, processor 12 may provide some or all of the functionality provided by the web server and workstation of the '863 application, among other things.

In FIG. 1, processor 12 is illustrated as a single unit. However, it should be appreciated that this is for illustrative purposes only and that in some implementations processor 12 may include a plurality of processing units. For instance, processor 12 may include a plurality of processors disposed within a single device and/or a plurality of devices (e.g., servers, desktop workstations, laptop workstations, etc.) with communication provided therebetween. In implementations in which processor 12 includes a plurality of devices, the devices may communicate via one or more operative links. These operative links may include a wired connection, a wireless connection, a discrete connection, a connection established via a network (e.g., the Internet, a WAN, a LAN, a MAN, etc.), and/or other operative links that would enable communication between the devices providing the functionality of processor 12 discussed below.

In some embodiments, processor 12 comprises a user interface module 18, an identification module 20, a disclosure module 22, an issuer cabinet module 24, an issue cabinet module 26, a custom cabinet module 28, an upload module 30, and a communication module 32. Modules 18, 20, 22, 24, 26, 28, 30, and 32 may be implemented in software; hardware; firmware; some combination of software, hardware, and/or firmware; and/or otherwise implemented. It should be appreciated that although modules 18, 20, 22, 24, 26, 28, 30, and 32 are illustrated in FIG. 1 as being co-located within a single processing unit, in embodiments in which processor 12 includes multiple processing units located remotely from each other, modules 18, 20, 22, 24, 26, 28, 30, and 32 may be located remotely from each other and operative communication between the modules may be achieved via one or more operative links. Further, the description of processor 12 in terms of modules 18, 20, 22, 24, 26, 28, 30, 32 is for illustrative purposes only. In some embodiments, more or fewer modules may be implemented to provide the functionality of modules 18, 20, 22, 24, 26, 28, 30, and 32 without departing from the scope of this disclosure.

User interface module 18 provides a user interface whereby a user is enabled to provide information to and receive information from system 10. In some embodiments, user interface module 18 enables a user to exchange information with system 10 via an application (e.g., a browser) being executed on client device 16.

Identification module 20 identifies a user based on identification information provided to processor 12 via the user interface enabled by user interface module 18. In some embodiments, the user may provide identification information to the system during a "log-in" procedure that enables the user to log-in to system 10. As used herein, the term "user" is not limited to a single person. Instead, "user" may refer to a plurality of people associated with a single entity. For example, in some instances a group of people associated with a household, a brokerage, a company, a financial institution, an insurer, a regulatory agency, or another entity may be considered to be a single entity. In one embodiment, the identification information may include one or both of a user name and a password. Other types of identification information may include an email address, a registration number, a verification file, and/or other information. Identification module 20 may identify the user by comparing identification information entered by the user with stored identification information associated with a plurality of users to determine a match between the entered identification information and the stored identification information. In some implementations, the stored identification information may be stored by storage module 14.

Disclosure module 22 may manage information within system 10 related to public disclosures of the issuers to one or more regulatory agencies. The management of information related to public disclosures may include performing some or all of the functionality of the workstation and web server in providing the web site described in the '863 application. For example, disclosure module 22 may store and/or provide access to information related to future required disclosures that must be filed by issuers (e.g., disclosures to be filed with MDRs), coordinate dissemination of disclosure materials to brokers and/or dealers, evaluate disclosure materials for completeness and/or correctness, inform interested parties (e.g., MDRs, brokers, dealers, holder, etc.) of unsatisfactory disclosure (e.g., failure to make disclosure, incomplete disclosure, etc.) by issuers, inform interested parties of relatively recent disclosures by issuers, archive and/or index disclosure materials for the lifespan of the corresponding securities, and/or otherwise manage information related to public disclosures, including further management of information related to public disclosures described in the '863 application.

For example, disclosure module 22 may manage information related to an extension of a guarantee or a substitution of a guarantor. Generally, a guarantee is issued on a given security by a guarantor for a predetermined period of time. Disclosure module 22 may use information related to an expiration date of the guarantee on the given security to remind the issuer of the given security that the expiration date is approaching. On or before the expiration date, the issuer must secure either an extension of the existing guarantee by the current guarantor, or a substitution of a new guarantor in place of the previous one. Both an extension and a substitution qualify as a material event that must be disclosed by the issuer in accordance with Rule 15 c2-12. Accordingly, when either an extension or a substitution is obtained by the issuer, disclosure module 22 may manage the disclosure of the event via the mechanism(s) discussed in the '863 application. Further, disclosure module 22 may prompt other modules of system 10 (e.g., issuer cabinet module 24, issue cabinet module 26, custom cabinet module 28, etc.) to make a supplemental disclosure of information related to the extension or substitution to purchasers/holders that are regulated by Rule 2a-7. The prompt may result in an automated release of information that is subject to restricted access, a request to the issuer for the requisite information, etc.

Upload module 30 may enable a user, such as a user associated with an issuer, to upload files to processor 12 and/or storage module 14. The uploaded files may be stored in storage module 14. The uploaded files may be organized according to an issuer, a security issue, and/or otherwise organized. Upload module 30 may enable the user to upload files by selecting, via the user interface provided by user interface module 18, one or more files stored on a client device 16 and receiving a transmission of the selected one or more files from the client device 16.

Communication module 32 may enable a user, such as a user associated with an issuer, to transmit files that have been uploaded to processor 12 and/or storage module 14 to one or more users. For instance, communication module 32 may be configured to generate electronic messages (e.g., emails, SMS messages, instant messenger messages, electronic voice messages, etc.) that provide information included in one or more files that have been uploaded to processor 12 and/or storage module 14. In some implementations, this may include including copies of the one or more files in the generated electronic messages. In some embodiment, communication module 32 may manage manual downloads of the files by to the one or more users. For example, communication module 32 may manage an FTP site, or other manual download format/interface. As is discussed further below, the users that receive the transmission of files from communication module 32 may include users that are approved by the issuer.

In some implementations, system 10 may enable an issuer of one or more securities to manage information related to the issuer. As used herein, the word "issuer" may refer to the entity actually issuing a security or instrument, as well as an agent of the issuing entity (e.g., an attorney, an accountant, etc.), an internal employee of the entity, and/or other parties associated or affiliated with the entity. In such implementations, issuer cabinet module 24 may manage the information related to the issuer. For instance, issuer cabinet module 24 may manage one or more files that are (1) associated with the issuer, and (2) stored by storage module 14. The types of information and/or files associated that may be managed by issuer cabinet module 24 may include information that facilitates a determination by purchasers/holders as to whether one or more securities issued by the issuer qualify as "eligible securities" under Rule 2a-7. For example, the information may include information related to financial information, information related to a payment default, information related to a credit downgrade (or upgrade), information related to an insolvency or bankruptcy event, and/or other information. The management of information by issuer cabinet module 24 may include uploading information to be managed, restricting access to the information to a predetermined list of users, transmitting the information to a list of users (including a predefined list of users and/or a list of users defined by the issuer), deleting information, and/or other management functions.

Figures 2, 3:
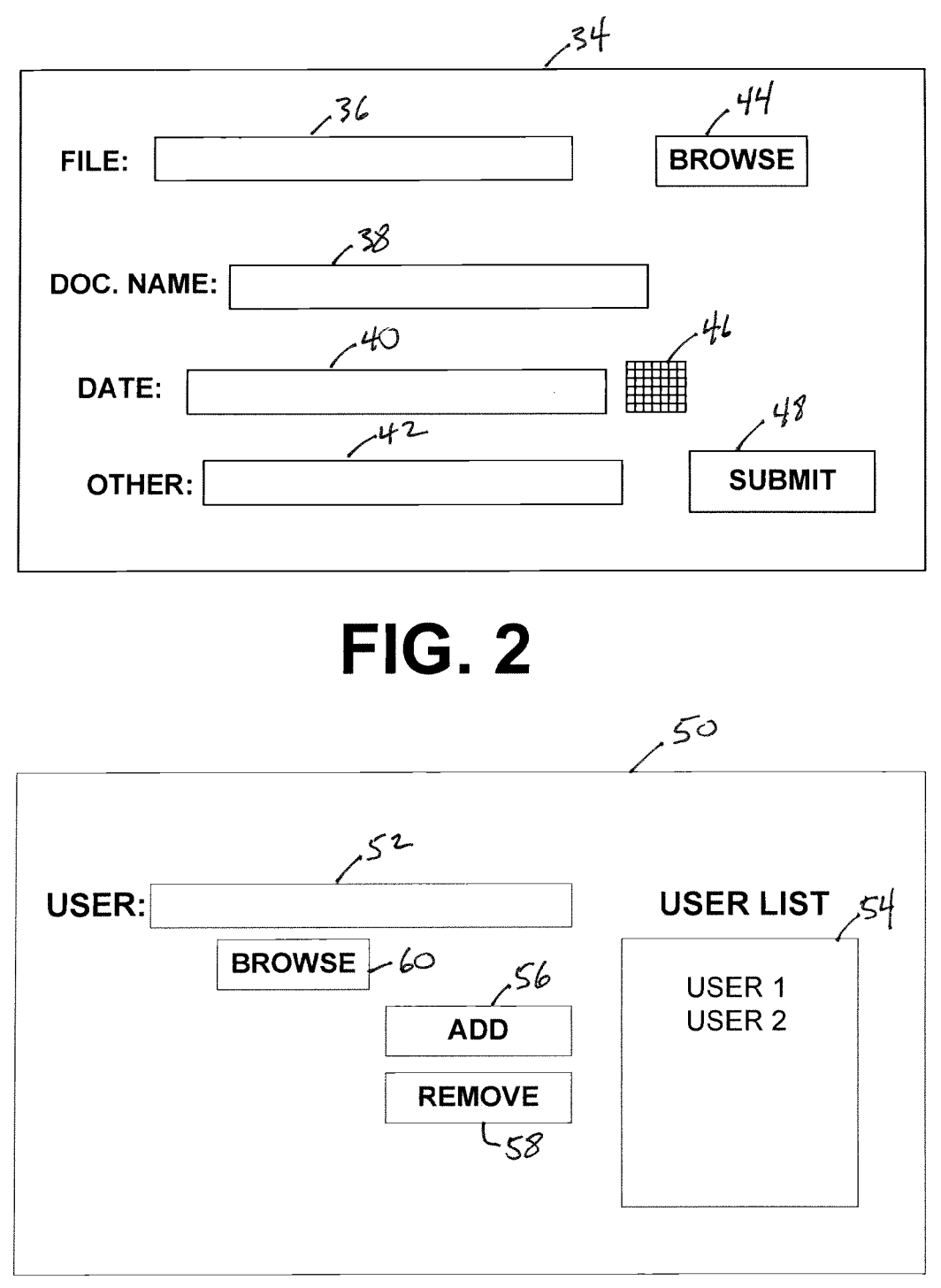

In some embodiments, issuer cabinet module 24 may enable the issuer to upload information to processor 12 and/or storage module 14 such that the information will be stored in storage module 14 and managed by issuer cabinet module 24. For instance, issuer cabinet module 24 may cause user interface module 18 to provide a user interface to the issuer that enables the issuer to select information to be uploaded. FIG. 2 illustrates a user interface 34 that may enable the issuer to select information to be uploaded.

As can be seen in FIG. 2, user interface 34 may include a file designation field 36, a file name field 38, a file date field 40, and/or other information field 42. File designation field 36 may enable the issuer to select one or more files stored locally on one of client devices 16. In some instances, user interface 34 may include a "browse" button 44 that may be selected by the issuer to browse the file directory of client device 16 to locate the one or more files for selection. File name field 38 may enable the issuer to input a title, a description, and/or other information to identify the one or more selected files. File date field 40 may enable the issuer to input a date relevant to the one or more selected files (e.g., date of execution, date of receipt, etc.). In some instances, user interface 34 may include a calendar button 46. If the user selects calendar button 46, a calendar may be provided to the issuer so that the issuer may select the relevant date from the calendar. Other information field 42 may enable the issuer to input other information about the file. For example, the issuer may list the securities to which the selected one or more files are related, and/or other information.

User interface 34 may include a submit button 48. The issuer may select submit button 48 to initiate the upload of the selected one or more files, and the other information entered by the user via user interface 34, to processor 12. In some instances, the initiation of the upload, and the ensuing upload, may be executed by upload module 30.

FIG. 3 illustrates a user interface 50 that enables the issuer to define a list of users that are approved to access information, such as uploaded files, managed by issuer cabinet module 24. In some instances, issuer cabinet module 24 may cause user interface module 18 to provide a user interface similar to user interface 50 to the issuer via one of client devices 16. In some embodiments, user interface 50 may include an approved user entry field 52, a list of approved users 54, an add user button 56, and a remove user button 58.

User entry field 52 may enable the issuer to enter the information that identifies a user of system 10. The issuer may manually enter the information, or the issuer may select a browse button 60 provided in user interface 50. If the issuer selects browse button 60, the issuer may browse a list of users of system 10 to select a user. The list of users may include a contact list. The contact list may be stored at storage module 14, or it may be stored locally to the issuer on client device 16. The contact list may include a contact list that is used globally for all users on system 10, a contact list that is specific to the issuer, a contact list that is specific to a user associated with the issuer, and/or other contact lists. Once the information identifying a user is entered in approved user entry field 52, the issuer may select add user button 56 to add the identified user to list of approved users 54. To remove a user from list of approved users 54, the issuer may select a user included in list of approved users 54 and then select remove button 58.

List of approved users 54 may be implemented by issuer cabinet module 24 to determine whether to grant access for a user to information managed by issuer cabinet module 24 based on the identification information provided by the user to identification module 20 when the user logs-on to system 10. List of approved users 54 may include, for instance, purchasers/holders of securities issued by the issuer, issuers (e.g., guarantors) of secondary securities (e.g., demand features) associated with one or more securities issued by the issuer, dealers, brokers, and/or other parties. By providing access to the uploaded information to these types of parties, system 10 may facilitate the determination by one or more money market funds as to whether one or more securities issued by the issuer qualify as "eligible securities" under the Rule. The determination may be facilitated by the relatively convenient, secure access to the information that is provided by system 10.

In some embodiments, the list of approved users may be predefined to include users for whom access to the uploaded files being managed by issuer cabinet module 24 would be appropriate. In these embodiments, the list may be predefined with or without cooperation/input from the issuer. For example, the list of approved users may be maintained by a system administrator to include only purchasers/holders (or parties associated therewith) that are regulated by Rule 2a-7. The system administrator may be responsible for updating the list to include only the relevant parties (e.g., adding and deleting parties as employment status changes, as funds governed by Rule 2a-7 are organized and/or dissolved, etc.). This would enable the issuer to provide restricted access to only relevant parties without having to expend resources to maintaining the list, and would provide a level of third-party oversight over the dissemination of the confidential information.

Figure 4:
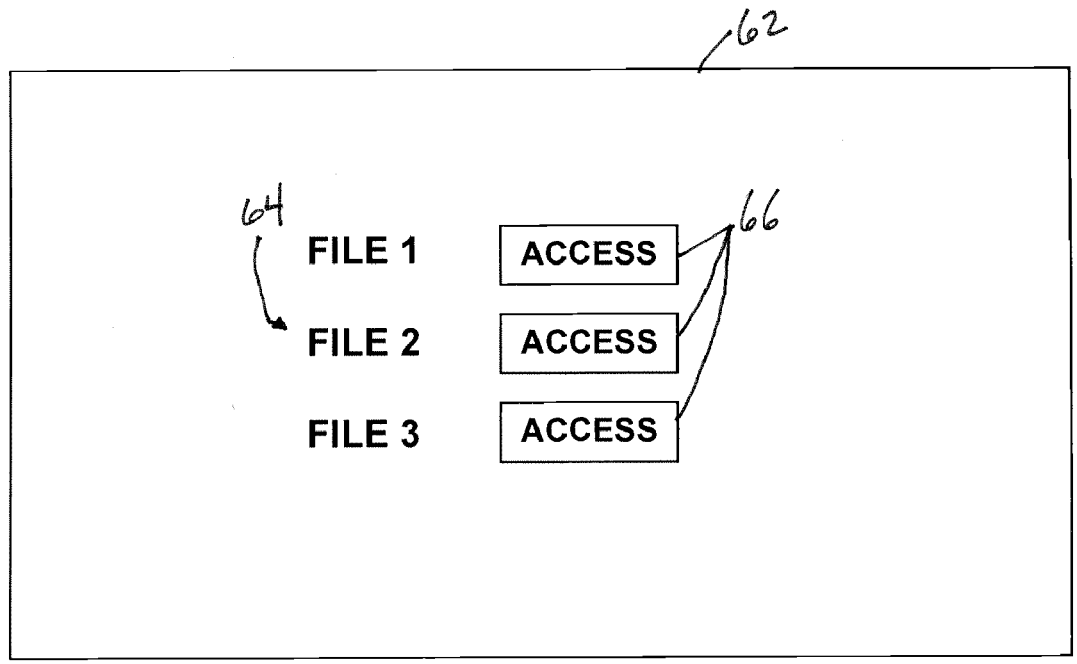
FIG. 4 illustrates a user interface, in accordance with one or more embodiments of the embodiments.

FIG. 4 illustrates a user interface 62 that enables a user (e.g., an approved user) to access information, such as uploaded files, managed by issuer cabinet module 24. In some instances, issuer cabinet module 24 may cause user interface module 18 to provide a user interface similar to user interface 62 to the issuer via one of client devices 16. User interface 62 may include a list of information 64 and one or more access buttons 66. List of information 64 may include an enumeration of the information (e.g., a list of uploaded files) that is managed by issuer cabinet module 24. By selecting an appropriate one of access buttons 66, the user may access selected information included in list of information 64. Accessing the selected information may include viewing one or more of the uploaded files that are managed by issuer cabinet module 24.

Figure 5:
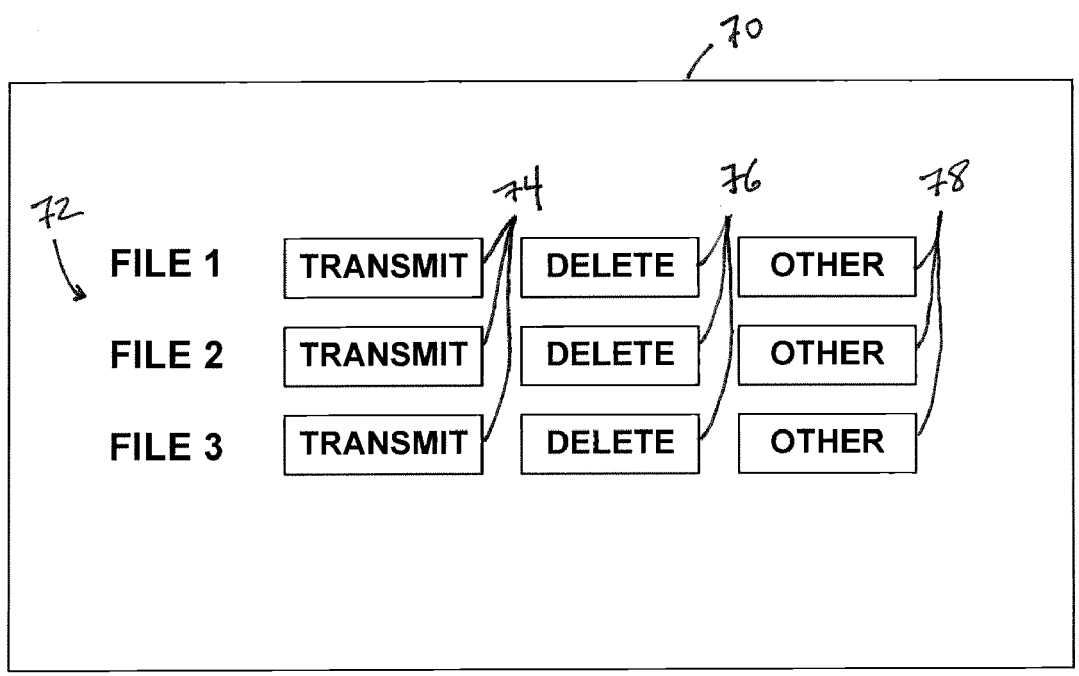
FIG. 5 illustrates a user interface, in accordance with one or more embodiments of the embodiments.

FIG. 5 illustrates a user interface 70 that enables the issuer to view a list of information, such as uploaded files, managed by issuer cabinet module 24. In some instances, issuer cabinet module 24 may cause user interface module 18 to provide a user interface similar to user interface 70 to the issuer via one of client devices 16. User interface 70 may include a list of information 72, one or more transmit buttons 74, one or more delete buttons 76, and/or one or more other action buttons 78. List of information 72 may enumerate information the information being managed by issuer cabinet module 24. This may include a list of files associated with the issuer that are being managed by issuer cabinet module 24 and/or stored by storage module 14.

User interface 70 may enable the issuer to transmit selected information from the list of information for transmission to users of system 10. For instance, by selecting an appropriate one of transmit buttons 74, the issuer may initiate transmission of selected ones of the listed files to users of system 10. This transmission of files may be accomplished by communication module 32 as was discussed above. The files may be transmitted to a predetermined list of users of system 10. This may include a list of users that is predefined by the issuer, as will be discussed below. In other implementations, the list of users may be predefined without input from the issuer, and may include users for whom it would be appropriate to receive a copy of the files. In some implementations, the issuer may further define the predefined list of users by adding additional users and/or deleting users typically included in the list of users. For instance, users may be added to, or removed from, the predefined list may include purchasers/holders of securities issued by the issuer, issuers (e.g., guarantors) of secondary securities (e.g., demand features) associated with one or more securities issued by the issuer, dealers, brokers, and/or other parties. In instances in which communication module 32 generates electronic messages that include copies of the selected files, the electronic messages may be generated for transmission to the list of users.

Transmission of the selected files by the issuer (or automatic transmission of the files to the predetermined list) may be initiated to provide effective notice to one or more interested parties of an event or events that may impact the determination as to whether one or more of the securities issued by the issuer may qualify as "eligible securities" under Rule 2a-7. For example, the events may include events impacting the credit-worthiness of the issuer (e.g., that impact the ability of a purchaser/holder to exercise one or more securities), extension or substitution obtained from a guarantor, a release of financial information of the issuer and/or a party (e.g., a guarantor) providing a secondary security (e.g., a guarantee) associated with a primary security associated with the issuer, and/or other events.

By selecting an appropriate one of delete buttons 76, the issuer may delete one or more file(s). The deletion of the selected file(s) may include one or more of the cessation of management of the selected file(s) by issuer cabinet module 24, the deletion of the selected file(s) from storage by storage module 14, and/or other actions to delete the selected file(s).

By selecting an appropriate one of other action buttons 78, the issuer may cause other actions with respect to one or more file(s) being managed by issuer cabinet module 24. For example, the issuer may edit information related to the file(s) (e.g., title, identification information, date, etc.) and/or perform other actions with respect to the selected file(s).

Figure 6:
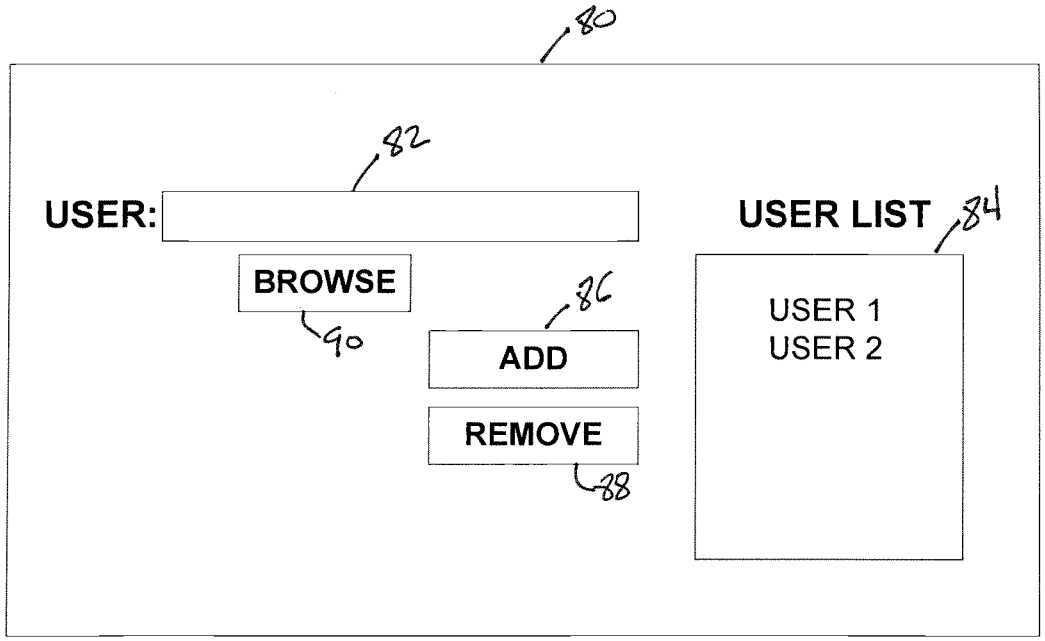
FIG. 6 illustrates a user interface, in accordance with one or more embodiments of the embodiments.

FIG. 6 illustrates a user interface 80 that enables the issuer to define a list of users that are to receive transmissions of files managed by issuer cabinet module 24 in response to the selection of one or more of transmit buttons 74 presented to the issuer in user interface 70 (as shown in FIG. 5). In some embodiments, user interface 80 may include a user entry field 82, a list of users 84, an add user button 86, and a remove user button 88. User entry field 82 may enable the issuer to enter the information that identifies a user of system 10.

The issuer may manually enter the information, or the issuer may select a browse button 90 provided in user interface 80. If the issuer selects browse button 90, the issuer may browse a list of users of system 10 to select a user. The list of users may include a contact list. The contact list may be stored at storage module 14, or it may be stored locally to the issuer on client device 16. The contact list may include a contact list that is used globally for all users on system 10, a contact list that is specific to the issuer, a contact list that is specific to a user associated with the issuer, and/or other contact lists. Once the information identifying a user is entered in user entry field 82, the issuer may select add user button 86 to add the identified user to list of users 84. To remove a user from list of users 84, the issuer may select a user included in list of users 84 and then select remove button 88. As has been discussed above, list of users 84 may be configured by the issuer to include purchasers/holders of securities issued by the issuer, issuers (e.g., guarantors) of secondary securities (e.g., demand features) associated with one or more securities issued by the issuer, dealers, brokers, and/or other parties involved in and/or interested in the determination as to whether one or more of the securities issued by the issuer qualify as "eligible securities" under the Rule.

In some embodiments, the list of users to receive the transmission may be fixed such that the issuer does not have the appropriate system permissions to alter it (e.g., by adding or deleting additional users). In these embodiments, the system administrator may be responsible for updating the list to include only the relevant parties (e.g., adding and deleting parties as employment status changes, as funds governed by Rule 2a-7 are organized and/or dissolved, etc.). This would enable the issuer to provide restricted access to only relevant parties without having to expend resources to maintaining the list, and would provide a level of third-party oversight over the dissemination of confidential information that may be the "property" of an entity other than the issuer (e.g., information related to a guarantor).

Returning to FIG. 1, in some implementations, system 10 may enable an issuer of one or more securities to manage information related to the securities issued by the issuer. In such implementations, issue cabinet module 26 may manage the information related to the specific securities issued by the issuer. For instance, issue cabinet module 26 may manage one or more files that are (1) associated with the securities issued by the issuer, and (2) stored by storage module 14. The types of information and/or files associated with the securities issued by the issuer that may be managed by issue cabinet module 26 may include information related to the issuer (e.g., some or all of the information uploaded to the issuer cabinet module), information related to a secondary security associated with the security issued by the issuer, and/or other information related to the security. Information related to the secondary security may include information related to the issuer(s) of the secondary security, the terms of the secondary security (e.g., the conditions that impact a purchaser/holder's ability to exercise the secondary options), information related to conditions that may impact a purchaser/holder's ability to exercise the secondary security (e.g., a credit downgrade, a payment default, an insolvency or bankruptcy event, etc.), documents associated with the secondary security (e.g., letters of credit, bond insurance documents, etc.), and/or other information related to the secondary security. The management of information by issue cabinet module 26 may include uploading information to be managed, associating the uploaded information with the appropriate one of the securities issued by the issuer, restricting access to the information to a list of users (including a predefined list of users and/or a list of users defined by the issuer), transmitting the information to a list of users (including a predefined list of users and/or a list of users defined by the issuer), deleting information, and/or other management functions.

Figure 7:
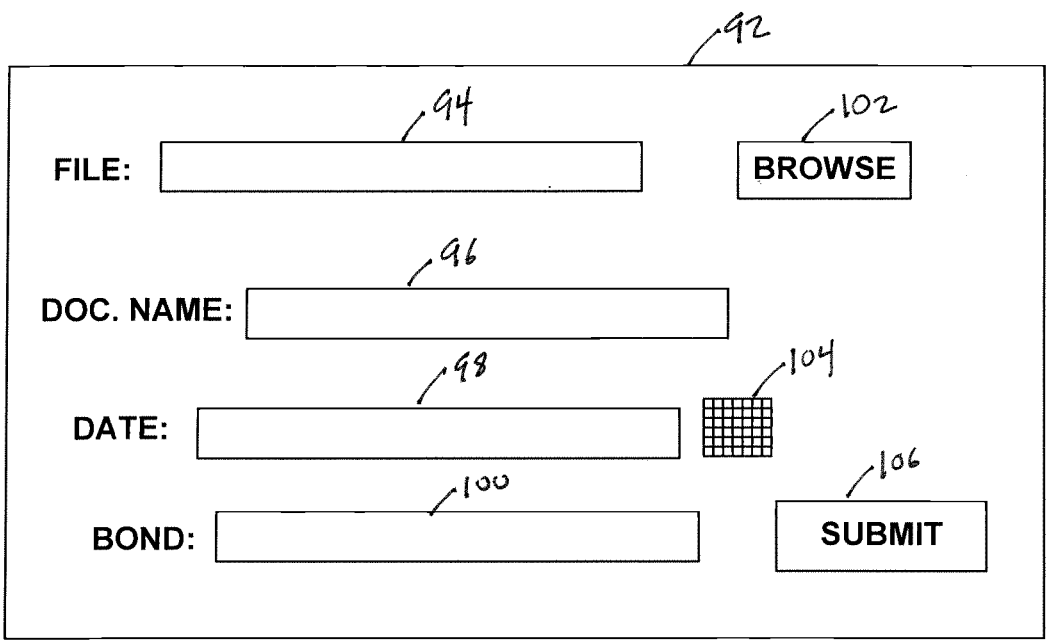
FIG. 7 illustrates a user interface, in accordance with one or more embodiments of the embodiments.

In some embodiments, issue cabinet module 26 may enable the issuer to upload information to processor 12 and/or storage 14 such that the information will be stored in storage module 14 and managed by issue cabinet module 26. For instance, issue cabinet module 26 may cause user interface module 18 to provide a user interface to the issuer that enables the issuer to select information to be uploaded. FIG. 7 illustrates a user interface 92 that may enable the issuer to select information to be uploaded.

As can be seen in FIG. 7, user interface 92 may include a file designation field 94, a file name field 96, a file date field 98, a security identification field 92 and/or other information fields. File designation field 94 may enable the issuer to select one or more files stored locally on one of client devices 16. In some instances, user interface 92 may include a "browse" button 102 that may be selected by the issuer to browse the file directory of client device 16 to locate the one or more files for selection. File name field 96 may enable the issuer to input a title, a description, and/or other information to identify the one or more selected files. File date field 98 may enable the issuer to input a date relevant to the one or more selected files (e.g., date of execution, date of receipt, etc.). In some instances, user interface 92 may include a calendar button 104. If the user selects calendar button 104, a calendar may be provided to the issuer so that the issuer may select the relevant date from the calendar. Security identification field 42 may enable the issuer to input information the specific security issued by the issuer that the information to be uploaded relates to. This may include a complete description of the security issue. In some implementations, the issuer may be enabled to select the specific security form a list of securities issued by the issuer (e.g., via a pull-down menu).

User interface 92 may include a submit button 106. The issuer may select submit button 106 to initiate the upload of the selected one or more files, and the other information entered by the user via user interface 92, to processor 12 and/or storage module 14. In some instances, the initiation of the upload, and the ensuing upload, may be executed by upload module 30.

Figure 8:
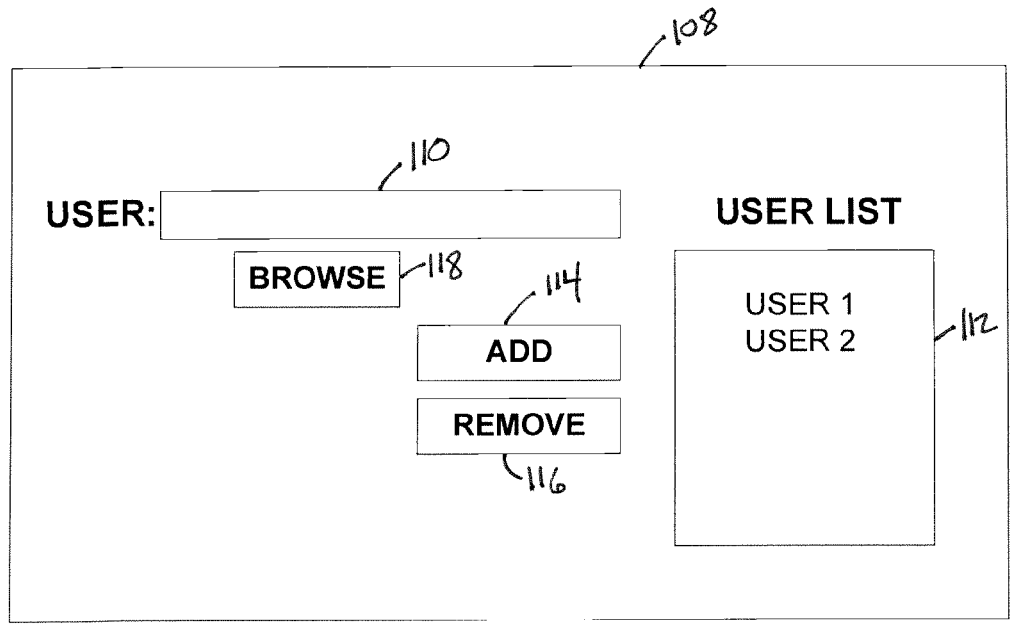
FIG. 8 illustrates a user interface, in accordance with one or more embodiments of the embodiments.

FIG. 8 illustrates a user interface 108 that enables the issuer to define a list of users that are approved to access information, such as uploaded files, managed by issue cabinet module 26. In some instances, issue cabinet module 26 may cause user interface module 18 to provide a user interface similar to user interface 108 to the issuer via one of client devices 16. In some embodiments, user interface 108 may include an approved user entry field 110, a list of approved users 112, an add user button 114, and a remove user button 116.

User entry field 110 may enable the issuer to enter the information that identifies a user of system 10. The issuer may manually enter the information, or the issuer may select a browse button 118 provided in user interface 108. If the issuer selects browse button 118, the issuer may browse a list of users of system 10 to select a user. The list of users may include a contact list. The contact list may be stored at storage module 14, or it may be stored locally to the issuer on client device 16. The contact list may include a contact list that is used globally for all users on system 10, a contact list that is specific to the issuer, a contact list that is specific to a user associated with the issuer, and/or other contact lists. Once the information identifying a user is entered in approved user entry field 110, the issuer may select add user button 114 to add the identified user to list of approved users 112. To remove a user from list of approved users 112, the issuer may select a user included in list of approved users 112 and then select remove button 116. It should be appreciated that issue cabinet module 26 may enable the issuer to define a list of approved users that are approved for access (1) to information related to all of the securities issued by the issuer, and/or (2) only for a certain subset of the securities issued by the issuer.

List of approved users 112 may be implemented by issue cabinet module 26 to determine whether to grant access to information to a user that logs-on to system 10, based on the identification of the user by identification module 20. In some instance, list of approved users 112 may include purchasers/holders of securities issued by the issuer, issuers (e.g., guarantors) of secondary securities (e.g., demand features) associated with one or more securities issued by the issuer, dealers, brokers, and/or other parties. By providing access to the uploaded information to these types of parties, system 10 may facilitate the determination by one or more money market funds as to whether individual ones of securities issued by the issuer qualify as "eligible securities" under Rule 2a-7. The determination may be facilitated by the relatively convenient, secure access to the information that is provided by system 10.

In some embodiments, the list of approved users may be predefined to include users from whom it would be appropriate to have access to the files related to the security issued by the issuer. In these embodiments, the list of approved users may or may not be predefined with input/cooperation from the issuer. For example, the list of approved users may be maintained by a system administrator to include only purchasers/holders (or parties associated therewith) that are regulated by Rule 2a-7. The system administrator may be responsible for updating the list to include only the relevant parties (e.g., adding and deleting parties as employment status changes, as funds governed by Rule 2a-7 are organized and/or dissolved, etc.). This would enable the issuer to provide restricted access to only relevant parties without having to expend resources to maintaining the list, and would provide a level of third-party oversight over the dissemination of the confidential information that is related to parties other than the issuer of the security (e.g., information related to a guarantor of the security).

Figure 9:
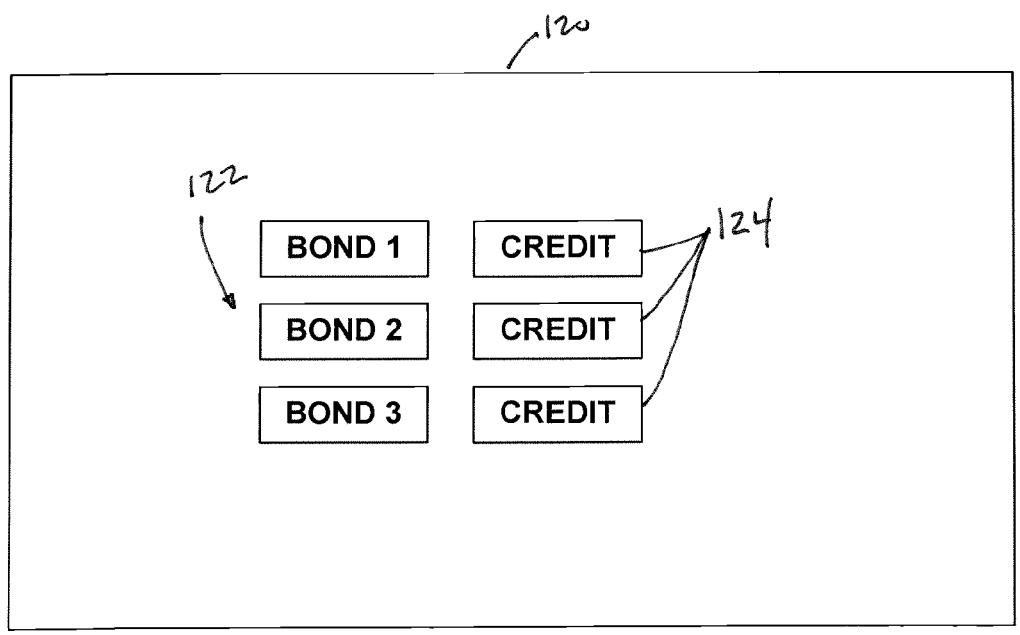
FIG. 9 illustrates a user interface, in accordance with one or more embodiments of the embodiments.

FIG. 9 illustrates a user interface 120 that enables a user to access information managed by issue cabinet module 26. The user may include the issuer, a user associated with the issuer, and/or other users that have been approved by the issuer. In some implementations, issue cabinet module 26 may cause user interface module 18 to provide a user interface similar to user interface 120 to the user via one of client devices 16. User interface 120 may include a list of securities 122 issued by the issuer. In some instances, list of securities 122 may include only the securities for which the user is included on the list of approved users defined by the issuer. In other instances, list of securities 122 may include all of the securities issued by the issuer. By selecting a specific one of the securities from list of securities 122 within user interface 120, the user may be provided with access to information about the specific securities (e.g., as discussed below). User interface 120 may also include one or more credit information buttons 124. By selecting an appropriate one of credit information buttons 124, the user may access documents related to one or more guarantees (e.g. a letter of credit, an insurance document, etc.) associated with a selected security issued by the issuer. The access of this kind of information is discussed further below.

Figure 10:
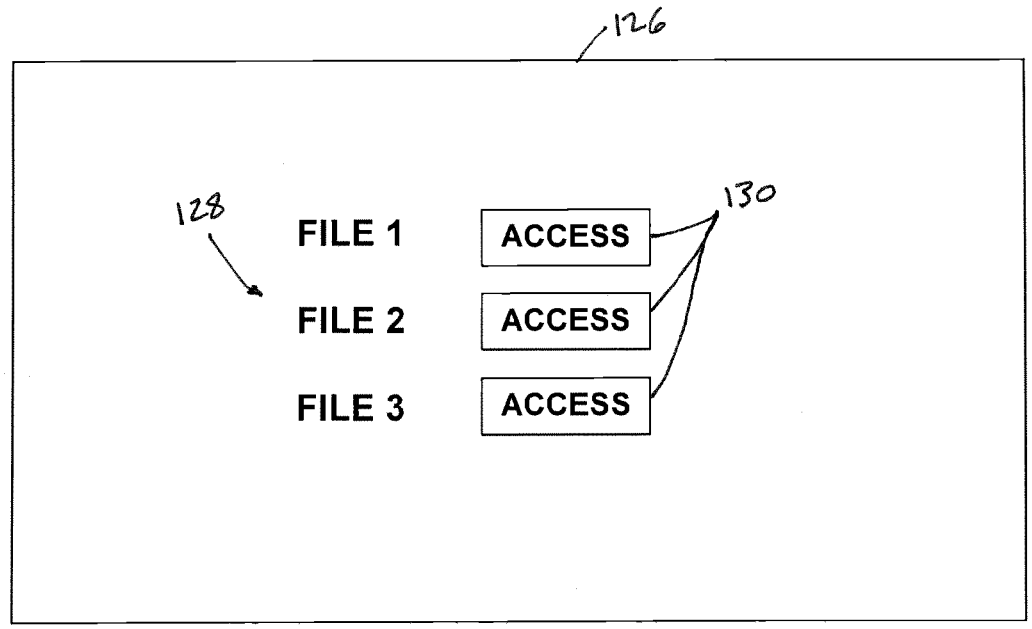
FIG. 10 illustrates a user interface, in accordance with one or more embodiments of the embodiments.

Upon selection of one of the securities from list of securities 122, the user may be presented with a user interface similar to a user interface 126 illustrated in FIG. 10. User interface 62 may include a list of information 128 and one or more access buttons 130. List of information 128 may include an enumeration of the information (e.g., a list of uploaded files) that is managed by issue cabinet module 26 and is associated with the security selected by the user from list of securities 122 (FIG. 9). By selecting an appropriate one of access buttons 130, the user may access selected information included in list of information 128. Accessing the selected information may include viewing one or more of the uploaded files that are managed by issue cabinet module 26 and are associated with the security selected by the user from list of securities 122 (FIG. 9).

Figure 11:
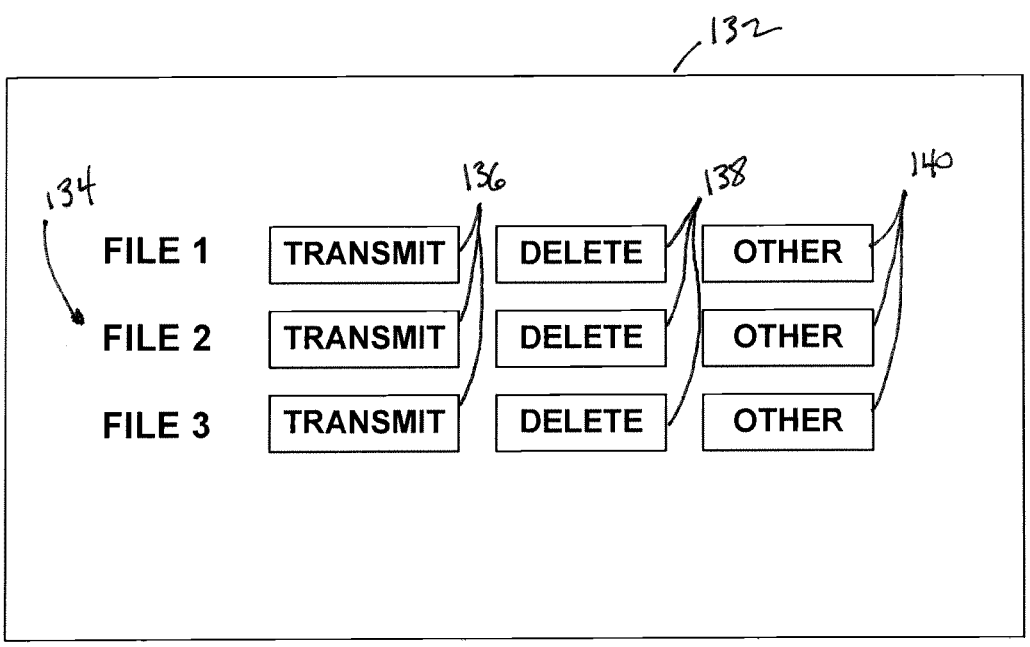
FIG. 11 illustrates a user interface, in accordance with one or more embodiments of the embodiments.

In some embodiments, upon FIG. 11 illustrates a user interface 132 that enables the issuer to view a list of information, such as uploaded files, managed by issue cabinet module 26. In some instances, issue cabinet module 26 may cause user interface module 18 to provide a user interface similar to user interface 132 to the issuer via one of client devices 16. User interface 132 may include a list of information 134, one or more transmit buttons 136, one or more delete buttons 138, and/or one or more other action buttons 140. List of information 134 may enumerate information the information being managed by issue cabinet module 26. This may include a list of files associated with the security that are being managed by issue cabinet module 26 and/or stored by storage module 14.

By selecting an appropriate one of transmit buttons 136, the issuer may initiate transmission of selected ones of the listed files to users of system 10. This transmission of files may be accomplished by communication module 32 as was discussed above. In instances in which communication module 32 generates electronic messages that include copies of the selected files, the electronic messages may be generated for transmission to a list of users that is defined by the user. This may include a list of users that are predefined by the issuer, as will be discussed below. In other instances, the list of users to whom the electronic messages are transmitted may be predefined without cooperation/input from the issuer. In some implementations, the issuer may further define the predefined list of users by adding additional users and/or deleting users typically included in the list of users. For instance, the predefined list of users may include purchasers/holders of securities issued by the issuer, issuers (e.g., guarantors) of secondary securities (e.g., demand features) associated with one or more securities issued by the issuer, dealers, brokers, and/or other parties. In instances in which communication module 32 generates electronic messages that include copies of the selected files, the electronic messages may be generated for transmission to the list of users.

Transmission of the selected files by the issuer (or automatic transmission of the files to the predetermined list) may be initiated to provide effective notice to one or more interested parties of an event or events that may impact the determination as to whether one or more of the securities issued by the issuer may qualify as "eligible securities" under Rule 2a-7. For example, the events may include events impacting the credit-worthiness of the issuer (e.g., that impact the ability of a purchaser/holder to exercise one or more securities), a change in identity of a party (e.g., a guarantor) providing a secondary security (e.g., a demand feature) associated with a primary security associated with the issuer, a release of financial information of the issuer and/or a party (e.g., a guarantor) providing a secondary security (e.g., a demand feature) associated with a primary security associated with the issuer, and/or other events.

By selecting an appropriate one of delete buttons 138, the issuer may delete one or more file(s). The deletion of the selected file(s) may include one or more of the cessation of management of the selected file(s) by issue cabinet module 26, the deletion of the selected file(s) from storage by storage module 14, and/or other actions to delete the selected file(s).

By selecting an appropriate one of other action buttons 140, the issuer may cause other actions with respect to one or more file(s) being managed by issue cabinet module 26. For example, the issuer may edit information related to the file(s) (e.g., title, identification information, date, etc.) and/or perform other actions with respect to the selected file(s).

Figure 12:
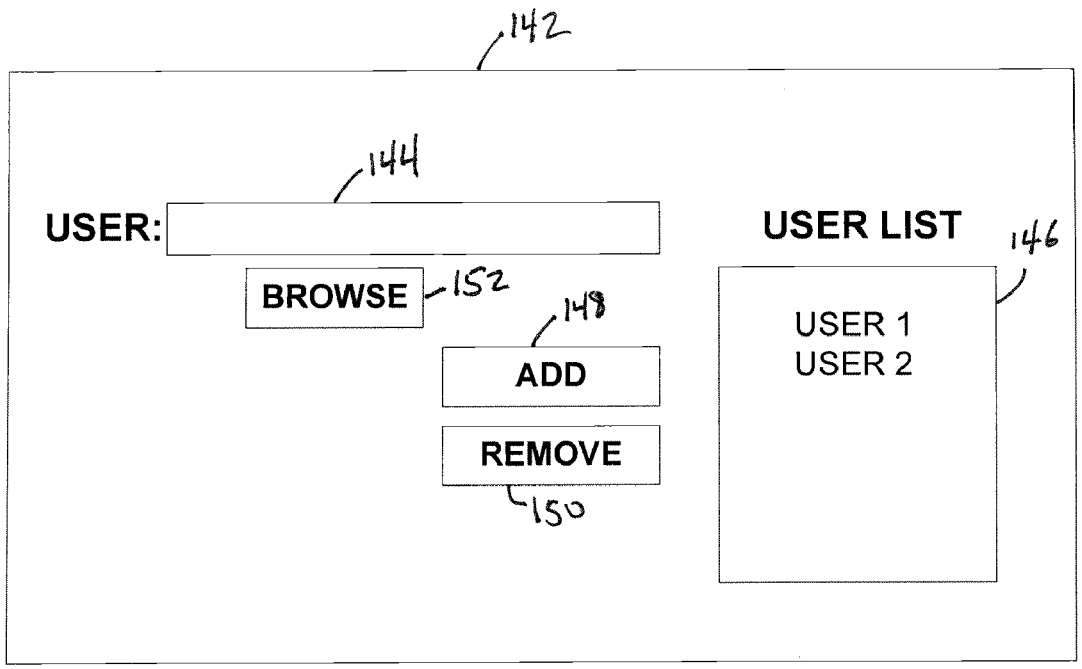
FIG. 12 illustrates a user interface, in accordance with one or more embodiments of the embodiments.

FIG. 12 illustrates a user interface 142 that enables the issuer to define a list of users that are to receive transmissions of files managed by issue cabinet module 26 in response to the selection of one or more of transmit buttons 136 presented to the issuer in user interface 132 (as shown in FIG. 11). In some embodiments, user interface 142 may include a user entry field 144, a list of users 146, an add user button 148, and a remove user button 150.

User entry field 144 may enable the issuer to enter the information that identifies a user of system 10. The issuer may manually enter the information, or the issuer may select a browse button 152 provided in user interface 142. If the issuer selects browse button 152, the issuer may browse a list of users of system 10 to select a user. The list of users may include a contact list. The contact list may be stored at storage module 14, or it may be stored locally to the issuer on client device 16. The contact list may include a contact list that is used globally for all users on system 10, a contact list that is specific to the issuer, a contact list that is specific to a user associated with the issuer, and/or other contact lists. Once the information identifying a user is entered in user entry field 144, the issuer may select add user button 148 to add the identified user to list of users 146. To remove a user from list of users 146, the issuer may select a user included in list of users 146 and then select remove button 150.

Figure 13:
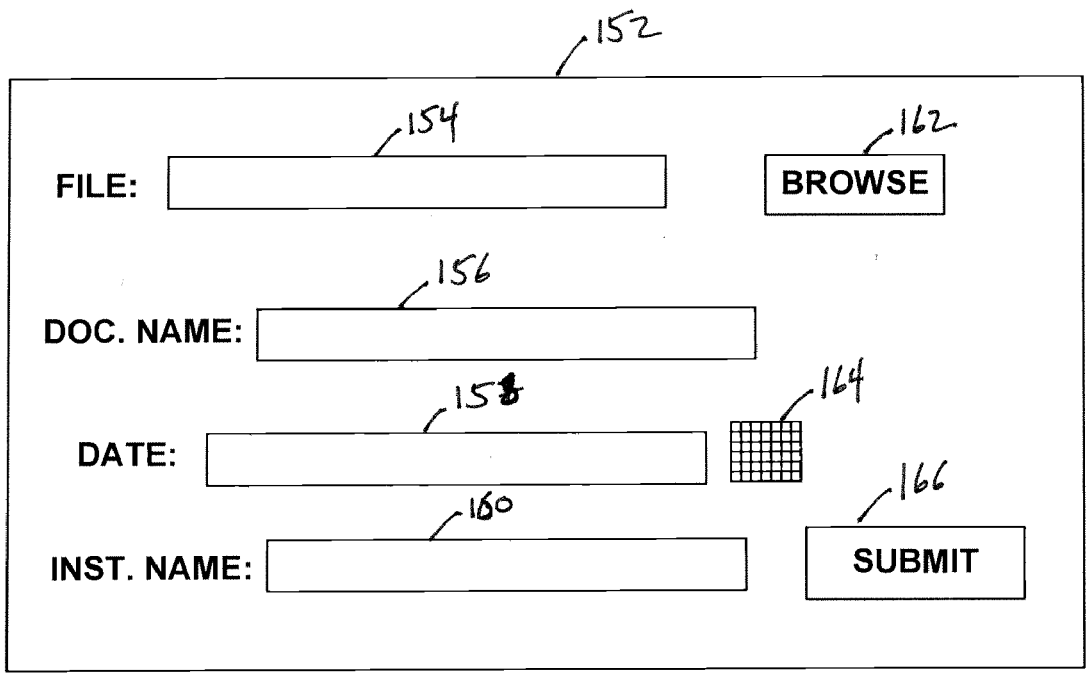
FIG. 13 illustrates a user interface, in accordance with one or more embodiments of the embodiments.

Returning to FIG. 9, as was mentioned above, by selecting an appropriate one of credit information buttons 124, the user may access information related to documents associated with a guarantee of a selected security issued by the issuer. In some embodiments, issue cabinet module 26 may enable the issuer to upload the documents associated with the guarantee of selected security issued by the issuer to processor 12 and/or storage module 14 such that the documents will be stored in storage module 14 and managed by issue cabinet module 24. For instance, issue cabinet module 26 may cause user interface module 18 to provide a user interface to the issuer that enables the issuer to select information to be uploaded. FIG. 13 illustrates a user interface 152 that may enable the issuer to select information to be uploaded.

As can be seen in FIG. 13, user interface 152 may include a file designation field 154, a file name field 156, a file date field 158, an institution name field 160 and/or other information fields. File designation field 154 may enable the issuer to select one or more files stored locally on one of client devices 16. The selected files may include copies of issued letters of credit related to a secondary security associated with the security issued by the issuer, insurance documents related to the security issued by the issuer (and/or a secondary security associated with the security), or other files. In some instances, user interface 152 may include a "browse" button 162 that may be selected by the issuer to browse the file directory of client device 16 to locate the one or more files for selection. File name field 156 may enable the issuer to input a title, a description, and/or other information to identify the one or more selected files (e.g., identify the related letter of credit). File date field 158 may enable the issuer to input a date relevant to the one or more selected files (e.g., date of execution, date of receipt, etc.). In some instances, user interface 152 may include a calendar button 164. If the user selects calendar button 164, a calendar may be provided to the issuer so that the issuer may select the relevant date from the calendar. Institution name field 160 may enable the issuer to input information that identifies an institution associated with the document being uploaded. The institution may include a bank or other financial institution, an insurer, and/or other institutions.

User interface 152 may include a submit button 166. The issuer may select submit button 166 to initiate the upload of the selected one or more files, and the other information entered by the user via user interface 152, to processor 12. In some instances, the initiation of the upload, and the ensuing upload, may be executed by upload module 30.

Once the selected one or more files have been uploaded by upload module and are being stored by storage module 14 and managed by issue cabinet module 26, the issuer may access the files to perform various tasks. For instance, if the issuer selects one of the credit information buttons 124 of user interface 120 (FIG. 9), issue cabinet module 26 may cause user interface module 18 to present a user interface to the issuer on one of client devices 16 (FIG. 1) that enables the issuer to access the uploaded documents related to a guarantee of the specific security issued by the issuer.

Figure 14:
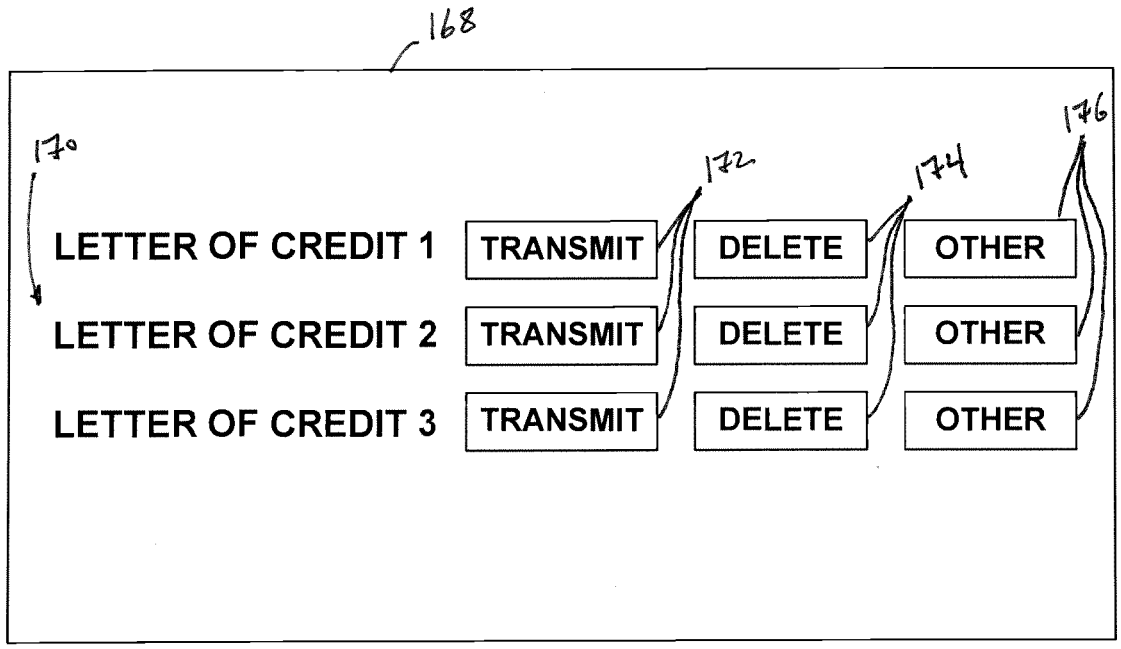
FIG. 14 illustrates a user interface, in accordance with one or more embodiments of the embodiments.
Figure 15:
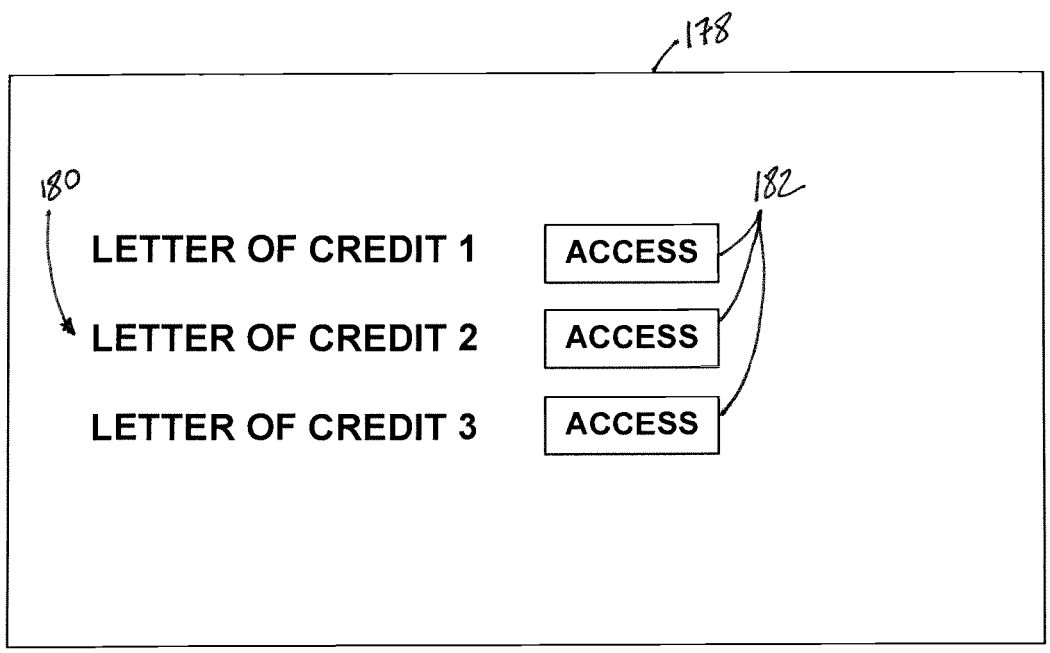
FIG. 15 illustrates a user interface, in accordance with one or more embodiments of the embodiments.

FIG. 14 illustrates a user interface 168 that may be presented to the issuer upon selection of one of the credit information buttons 124 of user interface 120 (FIG. 9). User interface 168 may include a list of documents 170, one or more transmit buttons 172, one or more delete buttons 174, and/or one or more other action buttons 176. List of documents 170 may list files that include information related to documents related to a guarantee of the security that are being managed by issue cabinet module 26.

By selecting an appropriate one of transmit buttons 172, the issuer may initiate transmission of selected ones of the listed documents to users of system 10. This transmission of documents may be accomplished by communication module 32 as was discussed above. In instances in which communication module 32 generates electronic messages that include copies of the selected files, the electronic messages may be generated for transmission to a list of users that is defined by the user. This may include the list of users defined by the issuer via user interface 142 (FIG. 12) to receive other transmissions related to the specific securities. In some implementations, the issuer may further define the predefined list of users by adding additional users and/or deleting users typically included in the list of users. For instance, users may be added to, or removed from, the predefined list.

By selecting an appropriate one of delete buttons 174, the issuer may delete one or more documents related to a guarantee of the security issued by the issuer. The deletion of the selected one or more documents may include one or more of the cessation of management of the selected documents by issue cabinet module 26, the deletion of the selected one or more documents from storage by storage module 14, and/or other actions to delete the selected one or more documents.

By selecting an appropriate one of other action buttons 78, the issuer may cause other actions with respect to one or more documents related to a guarantee being managed by issue cabinet module 26. For example, the issuer may edit information related to the one or more documents (e.g., title, identification information, date, etc.) and/or perform other actions with respect to the selected one or more documents.

Referring back to FIG. 9, the user that selects one of the credit information buttons 124 associated with a specific securities issued by the issuer may not be associated with the issuer. In this case, if the user has logged-in to system 10 by providing identification information that corresponds to one of the users on the list of approved users for the specific securities (e.g., as defined by the issuer via user interface 142 (FIG. 12)), the user may be provided with a user interface that enables the user to view the documents associated with a guarantee of the security being managed by issue cabinet module 26.

Figure 16:
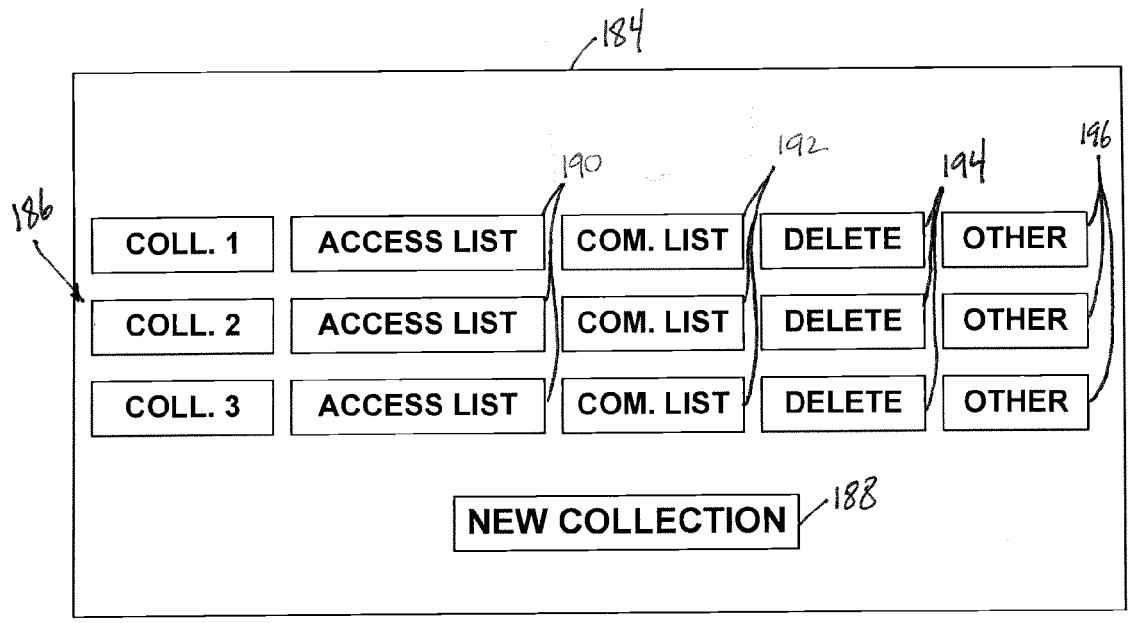
FIG. 16 illustrates a user interface, in accordance with one or more embodiments of the embodiments.

For instance, FIG. 16 illustrates a user interface 178 that enables the user to view (or otherwise access) the document that relates to the specific securities issued by the issuer. User interface 178 may include a list of documents 180 and one or more access buttons 182. List of documents 180 may include an enumeration of the documents related to a guarantee of the specific security issued by the issuer that are being managed by issue cabinet module 26. By selecting an appropriate one of access buttons 182, the user may access selected information included in list of documents 180. Accessing the selected information may include viewing one or more of the uploaded documents that are managed by issue cabinet module 26 and are associated with the security selected by the user from list of securities 122 (FIG. 9).

In certain instances, the transmission of files by issue cabinet module 26 may be automated, and may transpire with little or no interaction from the issuer. For example, when a material event is disclosed by system 10 (e.g., via disclosure module 22), issue cabinet module 26 may automatically transmit information related to the material event to users included in a predefined list of users (e.g., a list that is predefined by the issuer, a list that is predefined without input from the issuer, etc.). This may include instances in which a substitution of a guarantor has been reported by system 10 in compliance with Rule 15 c2-12. In addition to reporting the substitution, system 10 (e.g., via issue cabinet module 26) may prompt the issuer to transmit information (or a link to information) that is relevant to purchasers/holders under Rule 2a-7, but is not suitable for public dissemination. This may include a purchase agreement, credit rating information related to the new guarantor, a letter of credit, etc. In some implementations, rather than prompting the issuer, system 10 (e.g., via issue cabinet module 26) may automatically initiate such a transmission.

Returning to FIG. 1, in some implementations, system 10 may enable an issuer of one or more securities to manage information uploaded to processor 12 and/or storage module 14 in an even more customizable manner than is provided via issuer cabinet module 24 and issue cabinet module 26. In such implementations, custom cabinet module 28 may manage uploaded information in a more customizable manner. For instance, custom cabinet module 28 may enable the issuer to set up customized collections of information, and provide access to the customized collections of information to customizable groups of users. This may be implemented for providing access to appropriate information for various parties that may not be provided with access to the information in implementations in which the predefined lists of users used to provide access to and/or dissemination of information by issuer cabinet module 24 and issue cabinet module 26 are assembled without input by the issuer (e.g., the lists are assembled by a system administrator). The parties which may be provided access by custom cabinet module 28 may include outside attorneys and/or accountants, arbitrage control entities, insurance companies, investors with holdings above a predetermined threshold size, and/or other parties. The information managed by custom cabinet module 28 may include, for example, purchase agreements, letters of credit, documents related to guarantor substitution, documents related to guarantor extension, final transcripts, insurance documents, etc.

The customizable management of information enabled by custom cabinet module 28 may include establishing collections of information, uploading information to be included in selected ones of the collections, restricting access to the information within a collection of information to a list of users (including a predefined list of users and/or a list of users defined by the issuer), transmitting the information within a collection of information to a list of users (including a predefined list of users and/or a list of users defined by the issuer), deleting information, and/or other management functions. In some embodiments, custom cabinet module 28 may cause user interface module 18 to present a user interface to the issuer that enables the issuer to manipulate the collections of information.

For example, FIG. 16 illustrates a user interface 184 that enables the issuer to manipulate the collections of information. User interface 184 may include a list of collections 186, an add collection button 188, one or more access management buttons 190, one or more transmission users buttons 192, one or more delete buttons 194, and/or one or more other buttons 196. Upon selection of add collection button 188 by the issuer, custom cabinet module 28 may cause user interface module 18 to present a user interface to the issuer on one of client devices 16 (FIG. 1) that enables the issuer to create a new collection.

Figure 17:
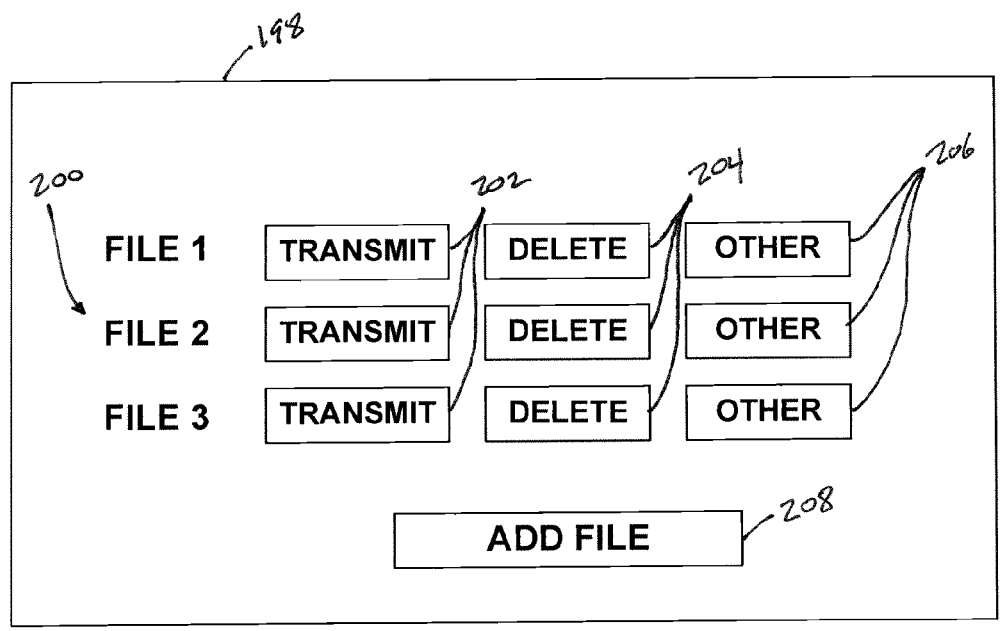
FIG. 17 illustrates a user interface, in accordance with one or more embodiments of the embodiments.

For example, FIG. 17 illustrates a user interface 198 that enables the issuer to create a new collection. User interface 198 includes a collection identification field 200 and a submit button 202. Collection identification field 200 may enable the issuer to enter information that may be used to identify the new collection (e.g., a title for the new collection). The issuer may select submit button 202 to create a new collection that will be identified by the identification information entered by the user in collection identification field 200. Upon selection of submit button 202, custom cabinet module 28 creates a new collection.

Referring back to FIG. 16, if the issuer selects a collection from list of collections 186, custom cabinet module 28 may cause user interface module 18 to present a user interface to the user via a client device 16 (FIG. 1) that enables the issuer to view files associated with the selected collection. For example, FIG. 17 illustrates a user interface 198 that enables the issuer to view files that include information associated with the selected collection. User interface 198 may include a list of files 200, one or more transmit buttons 202, one or more delete buttons 204, one or more other action buttons 206, and/or an add button 208. List of files 20 may enumerate the files being managed by custom cabinet module 28 as part of the collection.

By selecting an appropriate one of transmit buttons 202, the issuer may initiate transmission of selected ones of the listed files to users of system 10. This transmission of files may be accomplished by communication module 32 as was discussed above. In instances in which communication module 32 generates electronic messages that include copies of the selected files, the electronic messages may be generated for transmission to a list of users that is defined by the user. This may include a list of users that are predefined by the issuer, as will be discussed below. In some implementations, the issuer may further define the predefined list of users by adding additional users and/or deleting users typically included in the list of users.

By selecting an appropriate one of delete buttons 204, the issuer may delete one or more file(s). The deletion of the selected file(s) may include one or more of the cessation of management of the selected file(s) by custom cabinet module 28, the deletion of the selected file(s) from storage by storage module 14, and/or other actions to delete the selected file(s).

By selecting an appropriate one of other action buttons 206, the issuer may cause other actions with respect to one or more file(s) being managed by custom cabinet module 28 as part of the collection. For example, the issuer may edit information related to the file(s) (e.g., title, identification information, date, etc.) and/or perform other actions with respect to the selected file(s).

Figure 18:
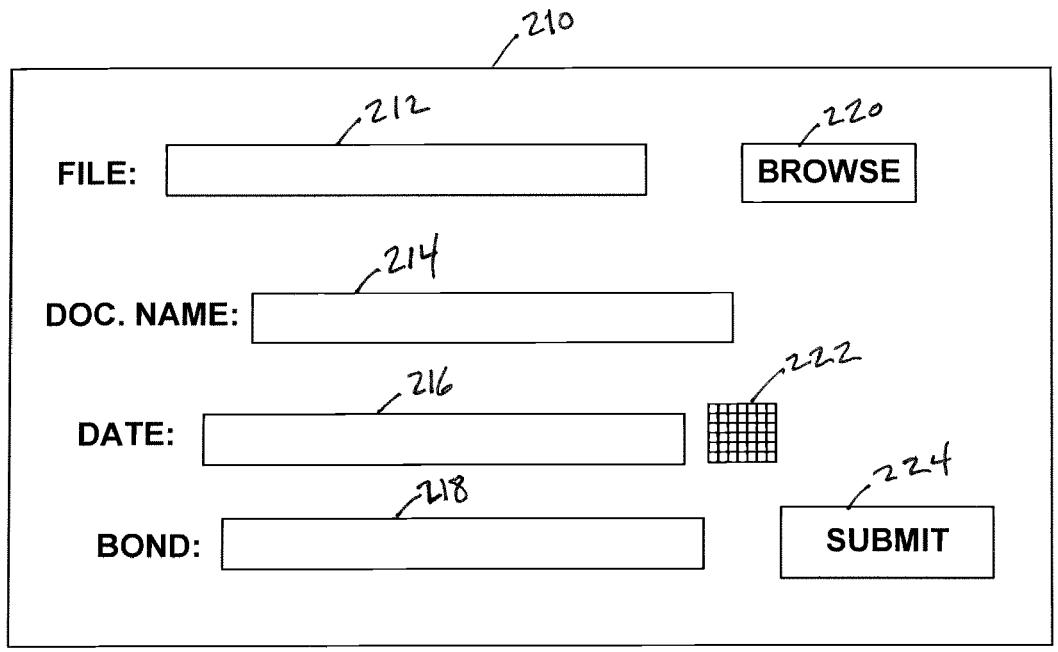
FIG. 18 illustrates a user interface, in accordance with one or more embodiments of the embodiments.

If the issuer selects add button 208, custom cabinet module 28 may cause user interface module 18 to present a user interface to the issuer that enables the issuer to add one or more files to the collection. The issuer may be enabled to add the one or more files to the collection by uploading the one or more files to processor 12 and/or storage module 14. FIG. 18 illustrates a user interface 210 that enables the issuer to upload one or files to be managed by custom cabinet module 28 as part of the collection. User interface 210 may include a file designation field 212, a file name field 214, a file date field 216, a security identification field 218 and/or other information fields. File designation field 212 may enable the issuer to select one or more files stored locally on one of client devices 16. In some instances, user interface 220 may include a "browse" button 220 that may be selected by the issuer to browse the file directory of client device 16 to locate the one or more files for selection. File name field 214 may enable the issuer to input a title, a description, and/or other information to identify the one or more selected files. File date field 216 may enable the issuer to input a date relevant to the one or more selected files (e.g., date of execution, date of receipt, etc.). In some instances, user interface 210 may include a calendar button 222. If the user selects calendar button 222, a calendar may be provided to the issuer so that the issuer may select the relevant date from the calendar. Security identification field 218 may enable the issuer to input information the specific security issued by the issuer to which the information to be uploaded relates. This may include a complete description of the security issue. In some implementations, the issuer may be enabled to select the specific security form a list of securities issued by the issuer (e.g., via a pull-down menu).

User interface 210 may include a submit button 224. The issuer may select submit button 224 to initiate the upload of the selected one or more files, and the other information entered by the user via user interface 210, to processor 12 and/or storage module 14. In some instances, the initiation of the upload, and the ensuing upload, may be executed by upload module 30. The selected one or more files may be uploaded such that they will be managed by custom cabinet module 28 as part of the collection.

Figure 19:
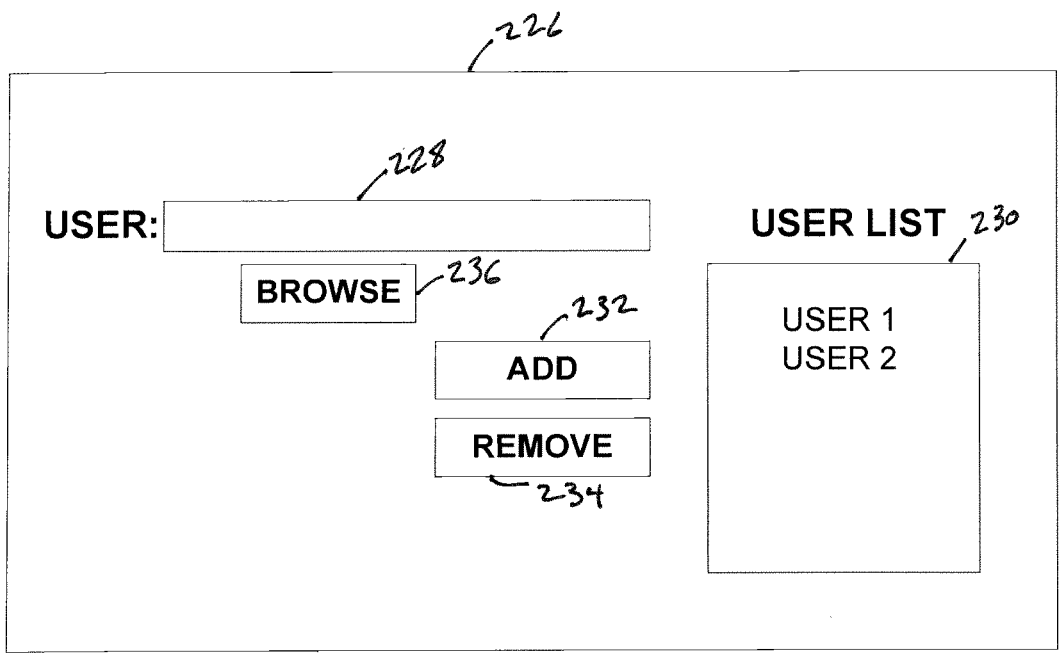
FIG. 19 illustrates a user interface, in accordance with one or more embodiments of the embodiments.

Returning to FIG. 16, upon selection of one of the user access buttons 190 by the issuer that corresponds to one of the collections managed by custom cabinet module 28, custom cabinet module 28 may cause user interface module 18 to present a user interface to the issuer via a client device 16 (FIG. 1) that enables the issuer to define a list of approved users that will be enabled to access information included in the collection of information associated with the selected user access button 190. FIG. 19 illustrates a user interface 226 that will enable the issuer to define such a user list. In some embodiments, user interface 226 may include an approved user entry field 228, a list of approved users 230, an add user button 232, and a remove user button 234.

User entry field 228 may enable the issuer to enter the information that identifies a user of system 10. The issuer may manually enter the information, or the issuer may select a browse button 236 provided in user interface 226. If the issuer selects browse button 236, the issuer may browse a list of users of system 10 to select a user. The list of users may include a contact list. The contact list may be stored at storage module 14, or it may be stored locally to the issuer on client device 16. The contact list may include a contact list that is used globally for all users on system 10, a contact list that is specific to the issuer, a contact list that is specific to a user associated with the issuer, and/or other contact lists. Once the information identifying a user is entered in approved user entry field 228, the issuer may select add user button 232 to add the identified user to list of approved users 230. To remove a user from list of approved users 230, the issuer may select a user included in list of approved users 230 and then select remove button 234.

List of approved users 230 may be implemented by custom cabinet module 28 to determine whether to grant access to information to a user that logs-on to system 10, based on the identification of the user by identification module 20.

Figure 20:
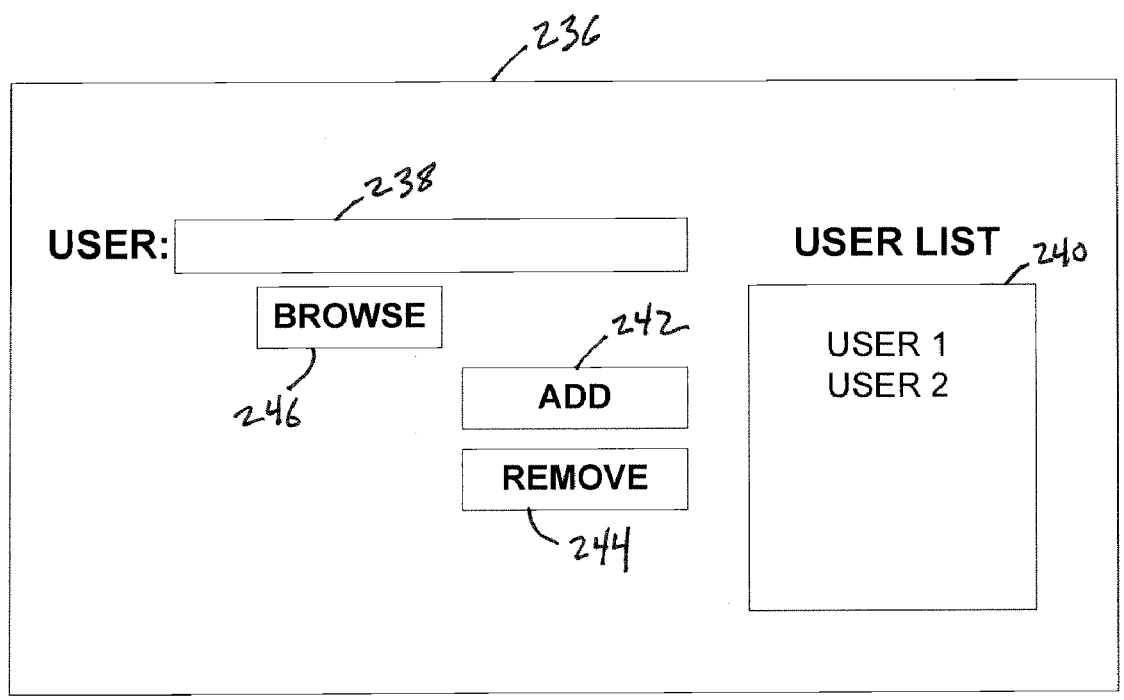
FIG. 20 illustrates a user interface, in accordance with one or more embodiments of the embodiments.

Returning to FIG. 16, if the issuer selects one of transmission user list buttons 192, custom cabinet module may cause user interface module 18 to present a user interface to the issuer that enables the issuer to define a list of users to receive transmissions of files included in the collection associated with the selected transmission user list button 192. The list that is defined by the user using this user interface may be implemented by custom cabinet module 28 as the list of users to which files are transmitted upon selection of a transmit button (e.g., transmit button 202 of FIG. 17). FIG. 20 illustrates a user interface 236 that enables the issuer to define a list of users that are to receive transmissions of files managed by custom cabinet module 28 as part of a collection, in response to the selection of one or more of transmit buttons 202 presented to the issuer in user interface 198 (as shown in FIG. 1171). In some embodiments, user interface 236 may include a user entry field 238, a list of users 240, an add user button 242, and a remove user button 244.

User entry field 238 may enable the issuer to enter the information that identifies a user of system 10. The issuer may manually enter the information, or the issuer may select a browse button 246 provided in user interface 236. If the issuer selects browse button 246, the issuer may browse a list of users of system 10 to select a user. The list of users may include a contact list. The contact list may be stored at storage module 14, or it may be stored locally to the issuer on client device 16. The contact list may include a contact list that is used globally for all users on system 10, a contact list that is specific to the issuer, a contact list that is specific to a user associated with the issuer, and/or other contact lists. Once the information identifying a user is entered in user entry field 238, the issuer may select add user button 242 to add the identified user to list of users 240. To remove a user from list of users 240, the issuer may select a user included in list of users 240 and then select remove button 244.

Referring back to FIG. 16, user interface 184 may enable the issuer to delete one or more collections being managed by custom cabinet module 28 by selecting the delete collection buttons 194 associated with the collection(s) to be deleted. Deleting a collection may include deleting files included in the collection, no longer managing files within the deleted collection with custom cabinet module 28, and/or other actions with respect to the files in the deleted collection.

Upon selection of one of the other action buttons 196 included in user interface 184, the issuer may control custom cabinet module 28 to take some other action with respect to the collection associated with the selected other action button 196. The other action may include, for example, renaming the collection and/or other actions.

Figure 21:
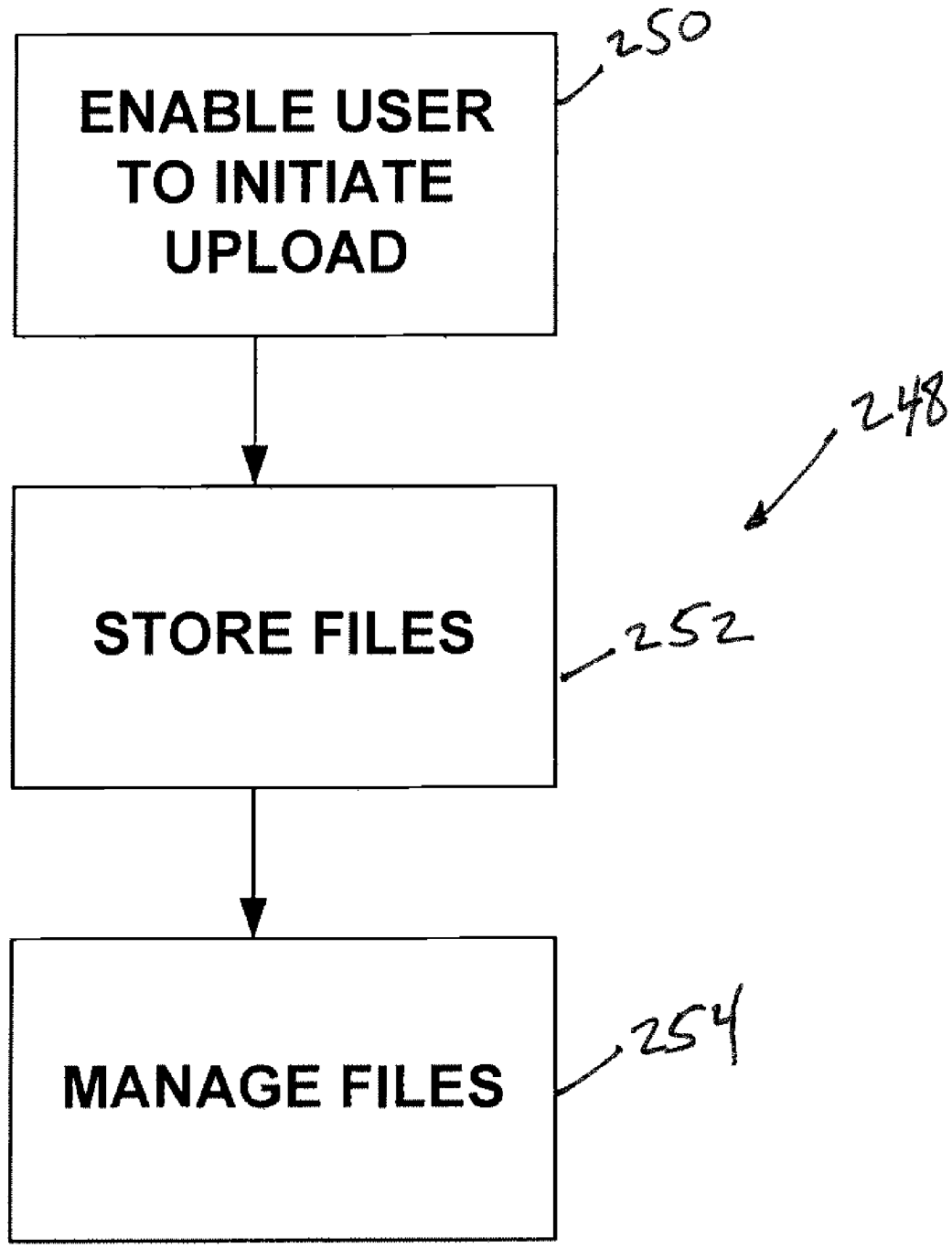
FIG. 21 illustrates a method of managing information related to securities issuers and/or securities issued by the securities issuers.

FIG. 21 illustrates a method 248 of managing information related to securities issuers and/or securities issued by the securities issuers. It should be appreciated that although in some embodiments the various operations of method 248 may be performed by the components of system 10 as described above, other embodiments exist in which the operation of method 248 are performed by other systems.

At an operation 250 of method 248, a securities issuer is enabled to initiate an upload of one or more files such that the uploaded files will be managed as part of a group of files. The one or more files may include information related generally to the security issuer and/or to a specific securities issued by the issuer. The group of files with which the uploaded files will be managed may include a group of files that include information generally related to the security issuer, information related to a specific security, and/or information with other commonalities. In some embodiments, operation 250 may include enabling the issuer to initiate an upload of the one or more files by upload module 30 via a user interface provided by user interface module 18, as discussed above. The group of files may include a group of files managed as a group by issuer cabinet module 24, issue cabinet module 26, or custom cabinet module 28, as described previously.

At an operation 252, the uploaded one or more files may be stored. In some embodiments, operation 252 may be performed by storage module 14 as discussed previously.

At an operation 254, the uploaded one or more files may be managed as at least a portion of a group of files related to the security issuer and/or a specific security issued by the security issuer. For example, the one or more files may be managed by issuer cabinet module 24, issue cabinet module 26, or custom cabinet module 28 in the manner described above.

In some implementations, the files uploaded, stored, and managed in operations 250, 252, and 254 may include information related to determining whether one or more of the securities issued by the issuer qualify as "eligible securities" under the Rule. Method 248 may provide a convenient, secure, and customizable information storage system that enables the information in the files to be controlled by the issuer and provided in a customizable manner to parties, such as money market funds and/or other parties, that hold or may be interested in holding securities issued by the issuer. The information may be provided to other interested parties, such as parties that are involved with providing guarantees on the securities, in a customizable manner as well.

Figure 22:
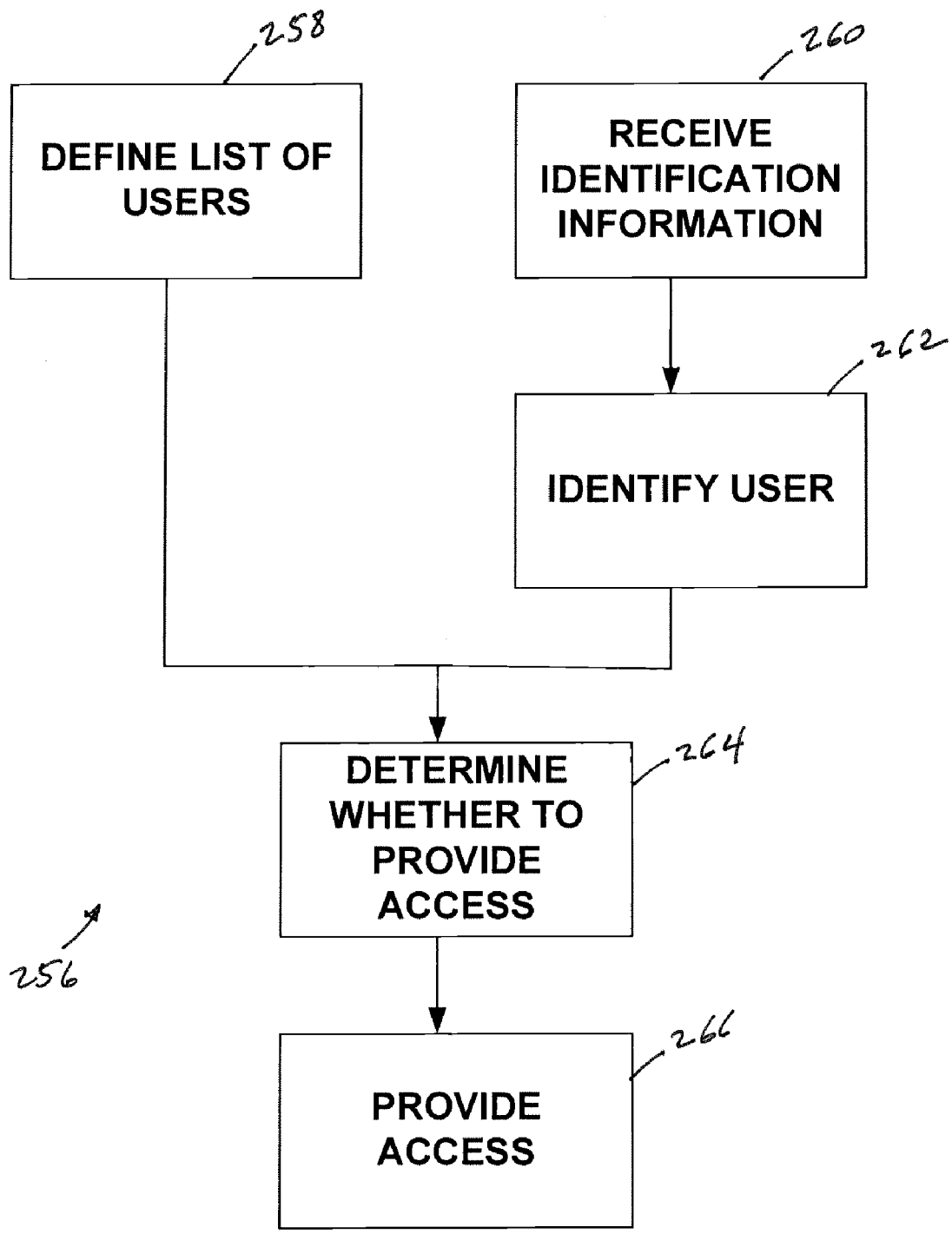
FIG. 22 illustrates a method of managing information related to securities issuers and/or securities issued by the securities issuers.

FIG. 22 illustrates a method 256 of managing a group of files related to an issuer and/or a specific security issued by the issuer. In some instances, method 256 may be implemented at operation 254 of method 248 (FIG. 21) described above. It should be appreciated that although in some embodiments the various operations of method 256 may be performed by the components of system 10 as described above, other embodiments exist in which the operation of method 256 are performed by other systems.

Method 256 may include an operation 258 at which a list of approved users are predefined. The list of approved users may be defined by an issuer, or without the input/cooperation of the security issuer. In some embodiments, the issuer may be enabled to define the list of approved users by issuer cabinet module 24, issue cabinet module 26, or custom cabinet module 28. The list of approved users may include purchasers/holders of securities issued by the issuer, issuers (e.g., guarantors) of secondary securities (e.g., demand features) associated with one or more securities issued by the issuer, dealers, brokers, and/or other parties.

At an operation 260 identification information may be received from a user. The user may be a user logging-on to a system, such as system 10. For example, operation 260 may include identification module 20 receiving identification information from a user via a user interface provided by user interface module 18 (FIG. 1).

At an operation 262, the user may be identified based on the received identification information. In some embodiments, operation 262 may be executed by identification module 20 (FIG. 1) in the manner described above.

Method 256 may include an operation 264 at which a determination is made whether to provide access to the group of files. The determination may be based on the list of users defined at operation 258 and the identification of the user at operation 262. For example, the determination may include determining if the identified user is one of the users included in the defined user list. In some embodiments, operation 264 may be performed by a module (e.g., one of modules 24, 26, or 28 of FIG. 1) managing the group of files related to the security issuer and/or a security issued by the securities issuer.

If a determination is made at operation 264 that the user should be provided with access to the group of files, access may be provided to the user at operation 266. In some embodiments, operation 264 may be performed by a module (e.g., one of modules 24, 26, or 28 of FIG. 1) managing the group of files related to the security issuer and/or a specific security issued by the security issuer.

It should be appreciated, that in some embodiments, method 256 may be implemented simultaneously (or substantially simultaneously) to manage a plurality of groups of documents at operation 254 of method 248 (FIG. 21).

Figure 23:
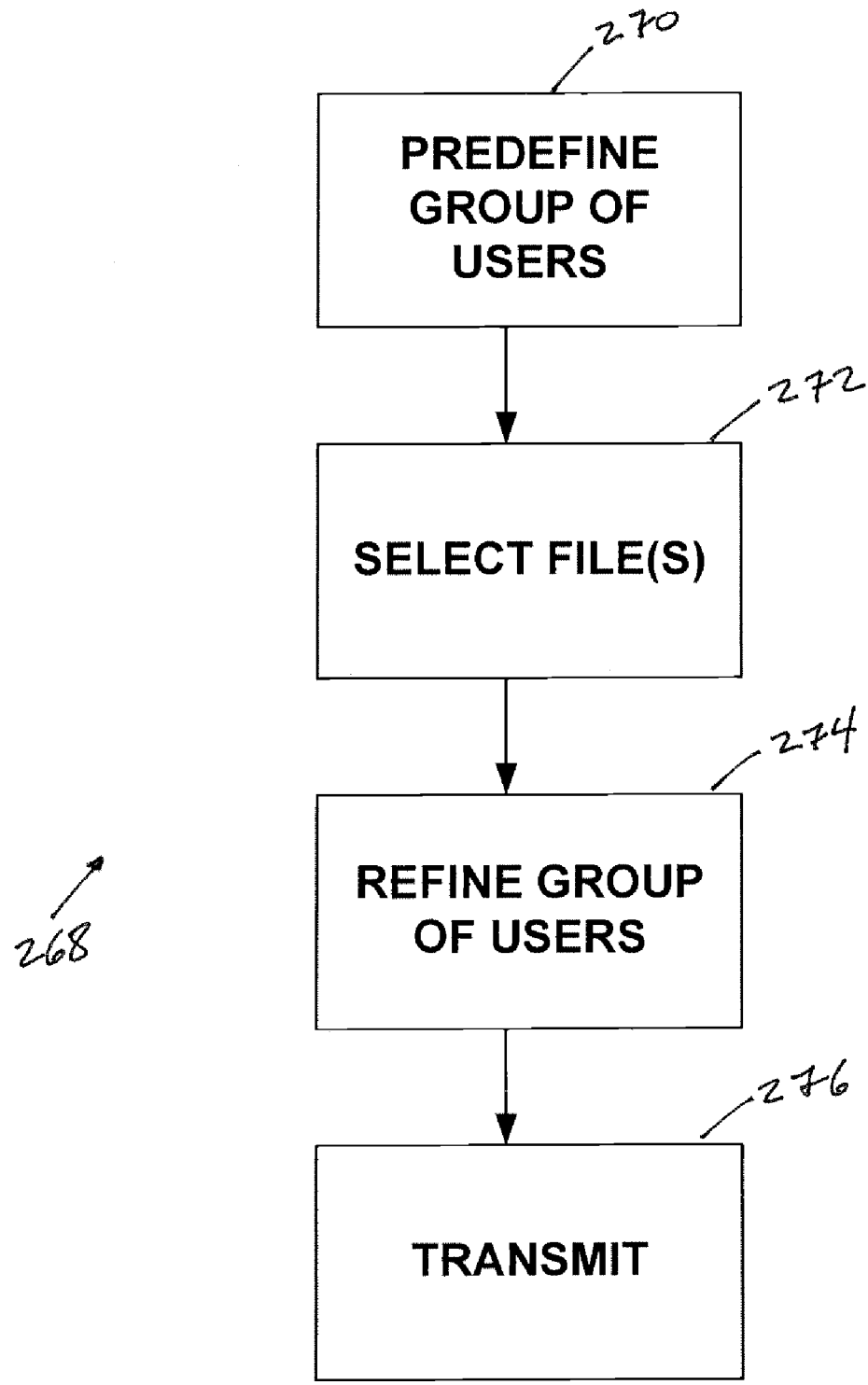
FIG. 23 illustrates a method of managing information related to securities issuers and/or securities issued by the securities issuers.

FIG. 23 illustrates a method 268 of managing a group of files related to a security issuer and/or a specific security issued by the security issuer. In some instances, method 268 may be implemented at operation 254 of method 248 (FIG. 21) described above. It should be appreciated that although in some embodiments the various operations of method 268 may be performed by the components of system 10 as described above, other embodiments exist in which the operation of method 268 are performed by other systems.

Method 268 may include an operation 270 at which a list of approved users are predefined. The list of approved users may be defined by a security issuer, or without the input/cooperation of the security issuer. In some embodiments, the security issuer may be enabled to define the list of approved users by issuer cabinet module 24, issue cabinet module 26, or custom cabinet module 28 in the manner described above. The list of approved users may include purchasers/holders of securities issued by the issuer, issuers (e.g., guarantors) of secondary securities (e.g., demand features) associated with one or more securities issued by the issuer, dealers, brokers, and/or other parties.

At an operation 272, the issuer may select one or more of the files included in the group of files being managed. For example, the issuer may be enabled to select one or more files being managed as a group by issuer cabinet module 24, issue cabinet module 26, or custom cabinet module 28 via a user interface provided by user interface module 18 (FIG. 1), as was described above. Once one or more of the files have been selected, the issuer may refine the list of users that was defined at operation 270. Refining the list of users may include adding a user or deleting a user.

The one or more files may then be transmitted to the users included in the list of users at an operation 276. In some embodiments, operation 276 may be executed by communication module 32, as is discussed above. Transmission of the selected files by the issuer (or automatic transmission of the files to the predetermined list) may provide effective notice to one or more interested parties of an event or events that may impact the determination as to whether one or more of the securities issued by the issuer may qualify as "eligible securities" under the Rule. For example, the events may include events impacting the credit-worthiness of the issuer (e.g., that impact the ability of a purchaser/holder to exercise one or more securities), a change in identity of a party (e.g., a guarantor) providing a secondary security (e.g., a demand feature) associated with a primary security associated with the issuer, a release of financial information of the issuer and/or a party (e.g., a guarantor) providing a secondary security (e.g., a demand feature) associated with a primary security associated with the issuer, and/or other events.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented, network-based system configured to manage files related to securities issued by securities issuers, the system comprising:

electronic storage that stores a list of users associated with money-market funds; and one or more processors configured to execute computer program modules, the computer program modules comprising:

a storage module configured to store a plurality of files, the plurality of files including files that are associated with individual ones of a plurality of securities issuers;

an issuer cabinet module accessible by a first issuer, the issuer cabinet module being configured to manage files from the plurality of files stored in the storage module that are associated with the first issuer, wherein the files associated with the first issuer include a first group of files corresponding to one or more municipal bonds issued by the first issuer that must be disclosed to the public under a first set of one or more regulatory rules related to secondary market disclosures for municipal bonds, and a second group of files for which public disclosure is not mandatory under the first set of one or more regulatory rules but are relevant to an assessment as to whether the one or more municipal bonds issued by the first issuer qualify as eligible securities under a second set of one or more regulatory rules regulating the types of securities that can be held by money-market funds;

a disclosure module configured to automatically send files from the first group of files to one or more computer systems associated with an entity that maintains secondary market disclosure data for municipal bonds and makes the first group of files available to the public on a publicly available website; and a communication module configured to provide access to the second group of files to money-market fund users included in the list of users associated with money-market funds, such that the money-market fund users receive access to the second group of files without the second group of files becoming accessible to unauthorized users not included in the list of users associated with money-market funds.

2. The system of claim 1, wherein the list of users associated with money-market funds is defined at least in part by the first issuer.

3. The system of claim 1, wherein the first set of one or more regulatory rules includes SEC Rule 15 c2-12 as amended at 59 FR 59360, Nov. 17, 1994, and the second set of one or more regulatory rules includes SEC Rule 2a-7 as defined at 66 FR 36156, 36161, Jul. 11, 2001.

4. The system of claim 1, wherein the one or more municipal bonds issued by the first issuer comprise one or more municipal bonds that include a demand feature, and wherein the files managed by the issuer cabinet module comprise one or more files that include information related to one or more events that impair a holder's ability to exercise the demand feature of one or more of the municipal bonds issued by the first issuer.

5. The system of claim 2, wherein the list of users associated with money-market funds is defined at least in part by the first issuer via selection of users from a set of users presented to the first issuer by the communication module, and wherein at least a portion of the set of users presented to the first issuer includes one or more users that are not provided on an issuer-specific basis.

6. The system of claim 1, wherein the communication module is configured to provide access to the second group of files to the list of users associated with money-market funds based on public disclosure of the first group of files by the disclosure module.

7. A computer-implemented method of managing files related to securities issued by securities issuers, the method comprising:

storing a list of users associated with money-market funds;

storing a plurality of files to electronic storage media, the plurality of files including files associated with individual ones of a plurality of securities issuers, wherein the plurality of files include a first group of files associated with one or more municipal bonds issued by a first issuer that must be disclosed to the public under a first set of one or more regulatory rules related to secondary market disclosures for municipal bonds, and a second group of files for which public disclosure is not mandatory under the first set of one or more regulatory rules but are relevant to an assessment as to whether the one or more municipal bonds issued by the first issuer qualify as eligible securities under a second set of one or more regulatory rules regulating the types of securities that can be held by money-market funds;

receiving from the first issuer, via a user interface provided to the first issuer on a client device, a selection indicating whether files associated with the first issuer should be included in the first group of files or the second group of files;

automatically publicly disclosing the first group of files by sending, over one or more computer networks, files from the first group of files to one or more computer systems associated with an entity that maintains secondary market disclosure data for municipal bonds and making files from the first group of files available to the public on a publicly available website; and providing access to the second group of files to money-market fund users included in the list of users associated with money-market funds, such that the money-market fund users receive access to the second group of files without the second group of files becoming accessible to unauthorized users not included in the list of users associated with money-market funds.

8. The method of claim 7, further comprising:

enabling the first issuer to define at least a part of the list of users associated with money-market funds.

9. The method of claim 7, wherein the list of users associated with money-market funds is determined prior to receiving the selection from the first issuer indicating whether files associated with the first issuer should be included in the first group of files or the second group of files.

10. The method of claim 7, wherein the first set of one or more regulatory rules includes SEC Rule 15 c2-12 as amended at 59 FR 59360, Nov. 17, 1994, and the second set of one or more regulatory rules includes SEC Rule 2a-7 as defined at 66 FR 36156, 36161, Jul. 11, 2001.

11. The method of claim 7, wherein the one or more municipal bonds issued by the first issuer comprise one or more municipal bonds that include a demand feature, and wherein the files that are (i) associated with the first issuer and (ii) relevant to an assessment as to whether the one or more municipal bonds issued by the first issuer qualify as eligible securities under the second set of one or more regulatory rules comprise one or more files that include information related to one or more events that impair a holder's ability to exercise the demand feature of one or more of the municipal bonds issued by the first issuer.

12. The method of claim 8, wherein enabling the first issuer to define at least a part of the list of users associated with money-market funds comprises presenting a set of users associated with money-market funds to the first issuer via the user interface, and receiving one or more selections of users associated with money-market funds made by the first issuer via the user interface, and wherein at least a portion of the set of users presented to the first issuer are automatically included in sets of users presented to a plurality of issuers.

13. The method of claim 7, wherein providing access to the second group of files to the list of users associated with money-market funds is initiated automatically based on the public disclosure of the first group of files.

14. A computer-implemented, network-based system that manages files related to securities issued by securities issuers, the system comprising:
   electronic storage that stores a list of users associated with money-market funds; and
   one or more processors configured to execute computer program modules, the computer program modules comprising:
   a storage module configured to store a plurality of files, the plurality of files including files that are associated with individual ones of a plurality of securities issuers;
   an issuer cabinet module accessible by an issuer, the issuer cabinet module being configured to manage files from the plurality of files stored in the storage module that are (i) associated with the issuer, and (ii) relevant to an assessment as to whether municipal bonds issued by the issuer qualify as eligible securities under one or more regulatory rules regulating the types of securities that can be held by money-market funds; and
   a communication module configured (i) to enable the issuer to select one or more of the files managed by the issuer cabinet module that are relevant to an assessment as to whether one or more of the municipal bonds issued by the issuer qualifies as an eligible security under the one or more regulatory rules, and (ii) to provide access to the selected one or more files to money-market fund users included in the list of users associated with money-market funds, such that the money-market fund users receive access to the selected one or more files without the selected one or more files becoming accessible to unauthorized users not included in the list of users associated with money-market funds.

15. The system of claim 14, wherein the list of users associated with money-market funds is defined at least in part by the issuer.

16. The system of claim 14, wherein the one or more regulatory rules includes SEC Rule 2a-7 as defined at 66 FR 36156, 36161, Jul. 11, 2001.

17. The system of claim 14, wherein at least one of the one or more municipal bonds issued by the issuer includes a demand feature, and wherein the selected one or more files include information related to the qualification of the demand feature as an eligible security under the one or more regulatory rules.

18. The system of claim 15, wherein the list of users associated with money-market funds is defined at least in part by the issuer via selection of users from a set of users associated with money-market funds presented to the issuer by the communication module, and wherein at least a portion of the set of users associated with money-market funds presented to the issuer includes one or more users that are not provided on an issuer-specific basis.

19. The system of claim 15, wherein the communication module is configured such that the list of users associated with money-market funds can be updated by a system administrator not associated with the issuer subsequent to definition of the list of users associated with money-market funds by the issuer.

20. A computer-implemented method of managing files related to securities issued by securities issuers, the method comprising:
   storing a list of users associated with money-market funds;
   storing a plurality of files in electronic storage media, the plurality of files including files associated with individual ones of a plurality of securities issuers;
   receiving from an issuer, via a user interface provided to the issuer on a client device, a selection of one or more stored files associated with the issuer that are relevant to an assessment as to whether one or more municipal bonds issued by the issuer qualify as an eligible security under one or more regulatory rules regulating the types of securities that can be held by money-market funds; and
   providing access to the selected one or more files to money-market fund users included in the list of users associated with money-market funds, such that the money-market fund users receive access to the selected one or more files without the selected one or more files becoming accessible to unauthorized users not included in the list of users associated with money-market funds.

21. The method of claim 20, further comprising:
   enabling the issuer to define at least a part of the list of users associated with money-market funds.

22. The method of claim 20, wherein the list of users associated with money-market funds is determined prior to receiving the selection from the issuer of the one or more of the stored files.

23. The method of claim 20, wherein the one or more regulatory rules includes SEC Rule 2a-7 as defined at 66 FR 36156, 36161, Jul. 11, 2001.

24. The method of claim 20, wherein at least one of the one or more municipal bonds issued by the issuer includes a demand feature, and wherein the files that are associated with the issuer and relevant to an assessment as to whether the one or more municipal bonds issued by the issuer qualify as an eligible security under one or more regulatory rules include information related to one or more events that impair a holder's ability to exercise the demand feature.

25. The method of claim 21, wherein enabling the issuer to define at least a part of the list of users associated with money-market funds comprises presenting a set of users to the issuer that are associated with money-market funds, and receiving one or more selections of users from the set of users associated with money-market funds from the issuer, and wherein at least a portion of the set of users presented to the issuer are automatically included in sets of users associated with money-market funds presented to a plurality of issuers.

26. The method of claim 21, further comprising enabling a system administrator not associated with the issuer to update the list of users associated with money-market funds subsequent to definition of the list by the issuer.

\* \* \* \* \*